United States Patent
Belleschi et al.

(10) Patent No.: US 11,979,859 B2
(45) Date of Patent: May 7, 2024

(54) METHODS AND SYSTEMS FOR AUTONOMOUS SIDELINK RESOURCE ALLOCATION

(71) Applicant: Telefonaktiebolaget LM Ericsson (publ), Stockholm (SE)

(72) Inventors: Marco Belleschi, Solna (SE); Shehzad Ali Ashraf, Aachen (DE); Ricardo Blasco Serrano, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 586 days.

(21) Appl. No.: 17/272,405

(22) PCT Filed: Aug. 30, 2019

(86) PCT No.: PCT/IB2019/057348
§ 371 (c)(1),
(2) Date: Mar. 1, 2021

(87) PCT Pub. No.: WO2020/044310
PCT Pub. Date: Mar. 5, 2020

(65) Prior Publication Data
US 2021/0337512 A1  Oct. 28, 2021

Related U.S. Application Data

(60) Provisional application No. 62/725,853, filed on Aug. 31, 2018.

(51) Int. Cl.
*H04W 72/02* (2009.01)
*H04W 4/40* (2018.01)
(Continued)

(52) U.S. Cl.
CPC ............ *H04W 72/02* (2013.01); *H04W 4/40* (2018.02); *H04W 28/26* (2013.01); *H04W 72/20* (2023.01)

(58) Field of Classification Search
CPC ....... H04W 4/40; H04W 28/26; H04W 72/02; H04W 72/20
See application file for complete search history.

(56) References Cited

U.S. PATENT DOCUMENTS

2021/0136699 A1* 5/2021 Scholand ................ H04W 4/40
2021/0307032 A1* 9/2021 Osawa ............... H04W 72/1263

FOREIGN PATENT DOCUMENTS

CN  108400857 A     8/2018
EP    3324695 A1 *  5/2018  ............ H04W 28/06
(Continued)

OTHER PUBLICATIONS

Author Unknown, "Technical Specification Group Services and System Aspects; Study on enhancement of 3GPP Support for 5G V2X Services (Release 16)," Technical Report 22.886, Version 16.0.0, 3GPP Organizational Partners, Jun. 2018, 67 pages.
(Continued)

*Primary Examiner* — Brian P Cox
(74) *Attorney, Agent, or Firm* — Sage Patent Group

(57) ABSTRACT

Methods and systems for autonomous sidelink resource allocation are provided. According to one aspect, a method performed by at least one wireless device for autonomous sidelink resource allocation comprises: at a first time, T1, transmitting a first control message announcing a first reservation of a set of radio resources for sidelink communication; at a second time, T2, transmitting a second control message announcing a second reservation of a set of radio resources for sidelink communication; and, at a third time, T3, performing a sidelink communication using the set of radio resources reserved by the second reservation. The second reservation may, for example, confirm the first
(Continued)

reservation, cancel or partially cancel the first reservation, modify the first reservation, or completely change the first reservation.

30 Claims, 15 Drawing Sheets

(51) Int. Cl.
*H04W 28/26* (2009.01)
*H04W 72/20* (2023.01)

(56) References Cited

FOREIGN PATENT DOCUMENTS

| | | |
|---|---|---|
| WO | 2018006313 A1 | 1/2018 |
| WO | 2018027528 A1 | 2/2018 |
| WO | WO-2018027528 A1 * | 2/2018 ............. H04W 4/40 |

OTHER PUBLICATIONS

Author Unknown, "Technical Specification Group Services and System Aspects; Service requirements for V2X services; Stage 1 (Release 15)," Technical Specification 22.185, Version 15.0.0, 3GPP Organizational Partners, Jun. 2018, 14 pages.
Author Unknown, "Technical Specification Group Radio Access Network; Evolved Universal Terrestrial Radio Access (E-UTRA); Physical channels and modulation (Release 15)," Technical Specification 36.211, Version 15.2.0, 3GPP Organizational Partners, Jun. 2018, 236 pages.
Author Unknown, "Technical Specification Group Radio Access Network; Evolved Universal Terrestrial Radio Access (E-UTRA); Physical layer procedures (Release 15)," Technical Specification 36.213, Version 15.2.0, 3GPP Organizational Partners, Jun. 2018, 536 pages.
Author Unknown, "Technical Specification Group Radio Access Network; Evolved Universal Terrestrial Radio Access (E-UTRA); Medium Access Control (MAC) protocol specification (Release 15)," Technical Specification 36.321. Version 15.2.0, 3GPP Organizational Partners, Jul. 2018, 126 pages.
Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.2.2, 3GPP Organizational Partners, Jun. 2018, 791 pages.
Author Unknown, "Technical Specification Group Radio Access Network; NR; Physical channels and modulation (Release 15)," Technical Specification 38.211, Version 15.2.0, 3GPP Organizational Partners, Jun. 2018, 93 pages.
Author Unknown, "Technical Specification Group Radio Access Network; NR; Physical layer procedures for control (Release 15)," Technical Specification 38.213, Version 15.2.0, 3GPP Organizational Partners, Jun. 2018, 98 pages.
Author Unknown, "Technical Specification Group Radio Access Network; NR; Physical layer procedures for data (Release 15)," Technical Specification 38.214, Version 15.2.0, 3GPP Organizational Partners, Jun. 2018, 95 pages.
Author Unknown, "Technical Specification Group Radio Access Network; NR; Medium Access Control (MAC) protocol specification (Release 15)," Technical Specification 38.321, Version 15.2.0, 3GPP Organizational Partners, Jun. 2018, 73 pages.
Author Unknown, "Technical Specification Group Radio Access Network; NR; Radio Resource Control (RRC) protocol specification (Release 15)," Technical Specification 38.331, Version 15.2.1, 3GPP Organizational Partners, Jun. 2018, 303 pages.
Panasonic, "R2-166643: Radio resource election behaviour for autonomous resource allocation mode," Third Generation Partnership Project (3GPP), TSG RAN WG2 Meeting #95bis, Oct. 10-14, 2016, 3 pages, Kaohsiung, Taiwan.
Schlienz, J., et al., "Device to Device Communication in LTE: Whitepaper," Rohde & Schwarz, Sep. 29, 2015, 36 pages, URL: https://www.rohde-schwarz.com/us/applications/device-to-device-communication-in-lte-white-paper_230854-142855.html.
Yasukawa, Shinpei, et al., "D2D Communications in LTE-Advanced Release 12," Technology Reports, NTT Docomo Technical Journal, vol. 17, No. 2, 2015, pp. 56-64.
International Search Report and Written Opinion for International Patent Application No. PCT/IB2019/057348, dated Dec. 13, 2019, 16 pages.
Office Action for Chinese Patent Application No. 201980071383.2, including Search Report, dated Nov. 13, 2023, 14 pages.
NTT Docomo, Inc., "Transmitter UE behaviour for sensing-based resource allocation," R1-165192, 3GPP TSG RAN WG1 Meeting #85, Nanjing, China May 23-27, 2016, 7 pages.

\* cited by examiner

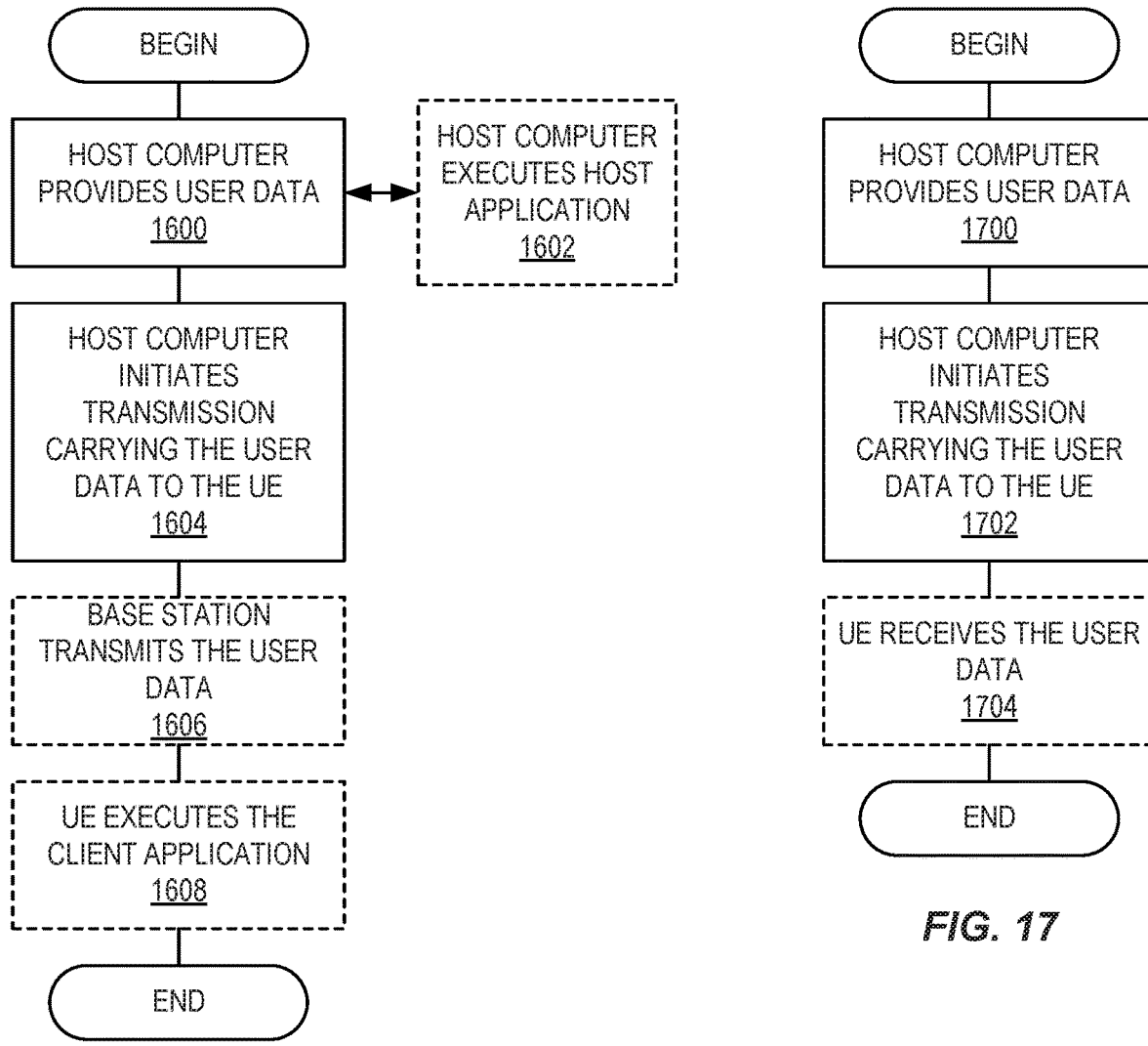

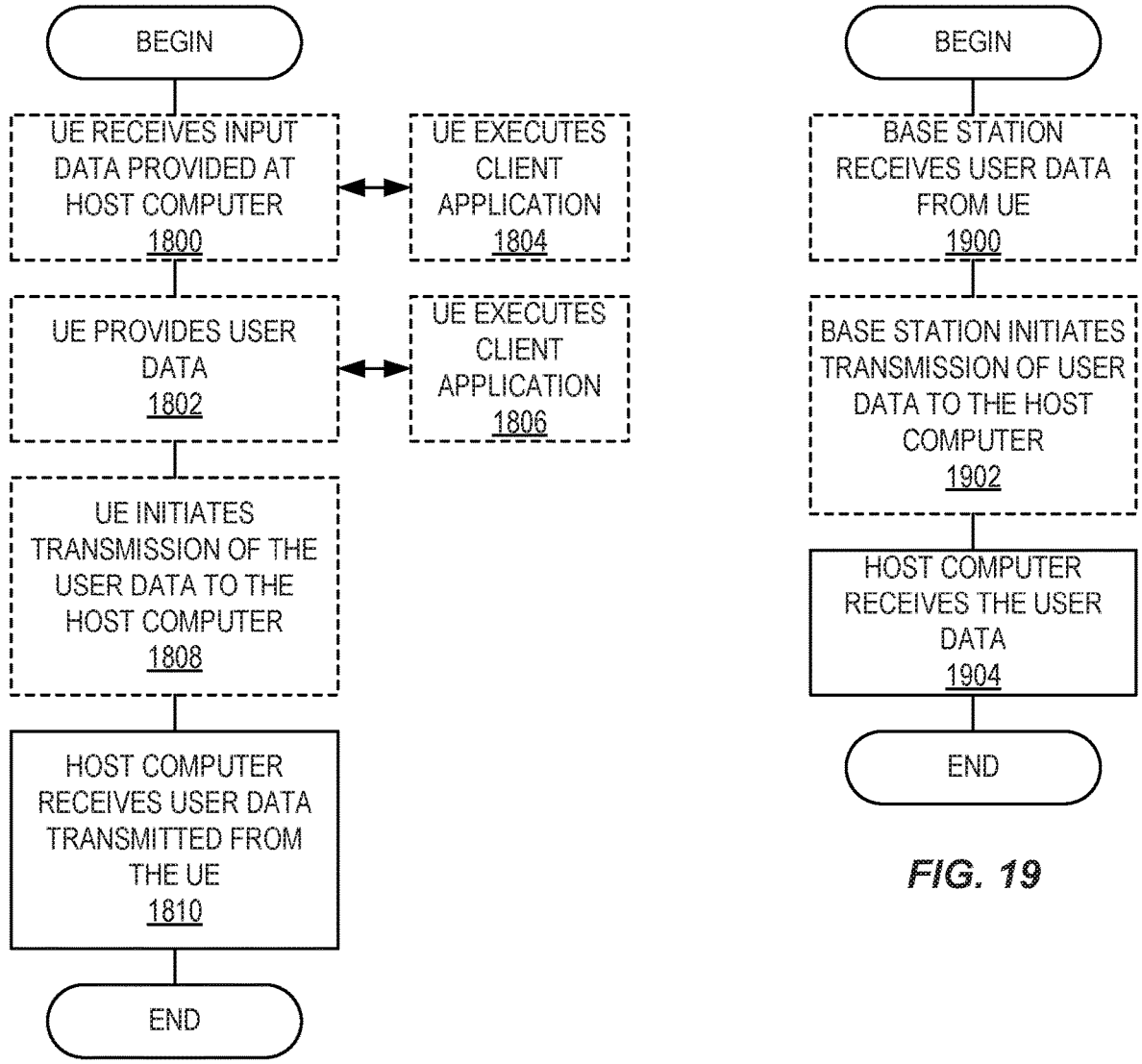

METHODS AND SYSTEMS FOR AUTONOMOUS SIDELINK RESOURCE ALLOCATION

RELATED APPLICATIONS

This application is a 35 U.S.C. § 371 national phase filing of International Application No. PCT/IB2019/057348, filed Aug. 30, 2019, which claims the benefit of provisional patent application Ser. No. 62/725,853, filed Aug. 31, 2018, the disclosures of which are hereby incorporated herein by reference in their entireties.

TECHNICAL FIELD

This application relates to sidelink communication (i.e., device-to-device communication that does not go through a base station), and specifically to autonomous sidelink resource allocation.

BACKGROUND

Vehicle-to-Everything (V2X)

In Third Generation Partnership Project (3GPP) Release (Rel-) 14 and Rel-15, the extensions for a device-to-device (D2D) network include support for V2X communication, which includes any combination of direct communication between vehicles, pedestrians, and infrastructure. V2X communication may take advantage of a network infrastructure, when available, but at least basic V2X connectivity should be possible even in case of lack of coverage. In Rel-16, 3GPP will study and possibly specify V2X communication using New Radio (NR).

There are several different V2X applications that are typically considered by standardization bodies:
- Vehicle-to-Vehicle (V2V): covering Long Term Evolution (LTE)/NR-based communication between vehicles, either via the cellular interface (known as Uu) or via the sidelink interface (known as PC5).
- Vehicle-to-Pedestrian (V2P): covering LTE/NR-based communication between a vehicle and a device carried by an individual (e.g., handheld terminal carried by a pedestrian, cyclist, driver or passenger), either via Uu or sidelink (PC5).
- Vehicle-to-Infrastructure (V2I)/Vehicle-to-Network (V2N): covering LTE/NR-based communication between a vehicle and a roadside unit/network. A Roadside Unit (RSU) is a transportation infrastructure entity (e.g., an entity transmitting speed notifications) that communicates with V2X capable User Equipment (UE) over sidelink (PC5) or over Uu. For V2N, the communication is performed on Uu.

FIG. 1 illustrates some of these V2X applications within a conventional LTE-based network, shown as a dashed oval in FIG. 1. The term V2X is used to refer to all of these scenarios, i.e., V2V, V2P, V2N, and V2I. Communication that occurs directly between two entities without going through a base station, enhanced or evolved Node B (eNB), or other intermediary is referred to as D2D. V2P and V2V are examples of D2D communication. Because V2N communication does involve an eNB, V2N communication is not considered D2D communication.

V2X communications may carry both non-safety and safety information, where each of the applications and services may be associated with specific requirements sets, e.g., in terms of latency, reliability, capacity, etc.

European Telecommunications Standards Institute (ETSI) has defined two types of Intelligent Transport System (ITS) messages for road safety: Cooperative Awareness Message (CAM) and Decentralized Environmental Notification Message (DENM).

CAM: The CAM message is intended to enable vehicles, including emergency vehicles, to notify their presence and other relevant parameters in a broadcast fashion. Such messages target other vehicles, pedestrians, and infrastructure, and are handled by their applications. The CAM message also serves as active assistance to safety driving for normal traffic. The availability of a CAM message is indicatively checked for every 100 milliseconds (ms), yielding a maximum detection latency requirement of <=100 ms for most messages.

DENM: The DENM message is event-triggered, such as by braking, and the availability of a DENM message is also checked for every 100 ms Depending on the use case latency, requirements for CAM and DENM may vary significantly. As an example, latency may vary from 20 ms (e.g., for pre-crash warnings) to 100 ms (e.g., for emergency stop or queue warnings) or 1000 ms (e.g., for non-safety related use cases such as traffic flow optimization, curve speed warnings, etc.).

The package size of CAM and DENM messages varies from 100+ to 800+ bytes and the typical size is around 300 bytes depending on the specific V2X use case, message type (e.g., DENM is supposed to be larger than CAM), and on the security format included in the packet (i.e., full certificate or certificate digest). The message is supposed to be detected by all vehicles in proximity.

FIG. 2 illustrates an example of cellular uplink resources that are used for sidelink communication. FIG. 2 shows a time/frequency graph with frequency on the Y axis and time on the X axis. The height of the large rectangle represents the system bandwidth, and the frequency range occupied by the six Resource Blocks (RBs) that are at the center of the frequency range corresponding to the system bandwidth are indicated as such. In the example shown in FIG. 2, the center six RBs periodically contain Primary Sidelink Synchronization Signals (PSSS), Secondary Sidelink Synchronization Signals (SSSS), and the Physical Sidelink Broadcast Channel (PSBCH). In the example shown in FIG. 2, frequency ranges above and below the center six RBs are reserved for sidelink communication, and include Physical Sidelink Control Channels (PSCCHs), Physical Sidelink Shared Channels (PSSCHs), and Physical Sidelink Discovery Channels (PSDCHs). As shown in FIG. 2, a communication period exists from the start of the PSCCH to the end of the PSSCH and a discovery period starts from the PSDCH and continues from there.

Sidelink (PC5) Resource Allocation (RA) for V2X

Currently in Rel-14/Rel-15, there are two different RA procedures for V2X on sidelink, i.e., centralized RA (so called "mode 3") and distributed RA (so called "mode 4"). The transmission resources are selected within a resource pool which is predefined or configured by the network.

Centralized or network scheduled RA (i.e., mode-3) is a resource allocation scheme in which the transmitting sidelink radio resources are dynamically scheduled/allocated by the network. Similar to Uu scheduling, the UE requests resources for transmissions to the network using uplink signaling (Scheduling Request (SR), Sidelink Buffer Status Report (SL-BSR)), and as a response, the network may grant resources via Physical Downlink Control Channel (PDCCH)

for sidelink transmission to the UE. Depending on the network decision, the grant provided by the network may be valid for the transmission of a single Transport Block (TB), including its retransmission, or for the transmission of multiple TBs over multiple periodic resources as for the Semi Persistent Scheduling (SPS) grant Distributed or autonomous RA (i.e., mode-4) is a resource allocation scheme in which the network provides a set of resources in broadcast fashion to be used on a certain carrier. UEs that are interested in sidelink operations then contend for such resources according to certain rules. For example, before using certain resources a UE may sense such resources for some time, and in case the resources are deemed to be free, the UE can select them for sidelink transmissions. Sensing is based on decoding of Sidelink Control Information (SCI) and Reference Symbol Received Power/Reference Signal Received Power (RSRP) measurement of PSSCH from surrounding UEs. To enable such sensing based resource allocation, no UE specific scrambling is adopted which implies on sidelink a UE cannot be recognized in L1.

Referring to the example shown in FIG. 2, a UE may transmit a control message during PSCCH, the control message reserving a portion of PSSCH for the UE to use for transmission of data. Other UEs that may also want to transmit during the PSSCH will see the control message transmitted from the first UE and thus will be notified that there has been a reservation of some portion of the PSSCH.

Depending on the specific service to be transmitted, the UE may either reserve such resources for multiple transmissions according to a desired pattern (which repeats periodically in the time domain), or it can simply select such resource for a single "one-shot" transmission.

For both RA modes, a SCI is transmitted on PSCCH to indicate the selected sidelink resources for sidelink transmissions. In mode-3, the SCI is transmitted by the network, and in mode-4, the SCI is transmitted by the UE.

Future V2X Enhancements

The 3GPP SA1 working group (hereinafter referred to as "SA1") has completed new service requirements for future V2X services in the FS_eV2X. SA1 have identified 25 use cases for advanced V2X services which will be used in Fifth Generation (5G) (e.g., LTE and NR). Such use cases are categorized into four use case groups: vehicles platooning, extended sensors, advanced driving, and remote driving. Direct unicast transmission over sidelink will be needed in some use cases such as platooning, cooperative driving, dynamic ride sharing, video/sensor data sharing, etc. Therefore, it is expected that future V2X use cases will go beyond classical ITS services, such safety services with CAM/DENM type of transmissions.

The consolidated requirements for each use case group are captured in Technical Report (TR) 22.886, Version 16.0.0. For these advanced applications, the expected requirements to meet the needed data rate, capacity, reliability, latency, communication range, and speed are made more stringent. In order to meet these requirements, some improvements should be implemented, such as: link adaptation for sidelink based on, e.g., Channel State Information (CSI) feedback; more Hybrid Automatic Repeat Request (HARQ) processes; and adaptive HARQ retransmissions for sidelink based on HARQ feedback, etc., as is done for a cellular "Uu" link.

Problems with Existing Solutions

There currently exist certain challenge(s). Existing autonomous sidelink resource allocation schemes have been designed to tackle strictly periodic traffic types and thus are not suitable to address dynamic variations in traffic patterns. For example, with mode-4 RA, the UE reserves a certain sidelink resource for future transmissions, assuming that a packet with a certain periodicity will be transmitted.

In fact, classical ITS services such as CAM/DENM type of transmissions are typically considered as periodic traffic types. Nevertheless, even CAM/DENM may be subject to occasional periodicity variations and packet size variations, because the message type generation and content is influenced by external events such as speed, vehicle trajectory, geographical positions, UE proximities, etc. Moreover, future V2X use cases may go beyond CAM/DENM types of transmissions. For example, it is expected that the sidelink will be used for video/sensor data sharing or even infotainment purposes which cannot be certainly seen as periodic traffic types; rather, they are typically characterized by bursty data.

Certainly, to address such traffic types the UE may perform one-shot transmission, but that may cause some system instability since sensing results may be affected (e.g., V2X communication is half-duplex, meaning that during a long burst transmission the device cannot receive information from other vehicles, pedestrians, etc.) Alternatively, the UE, which is operating under network coverage, may be configured for mode-3 operation, but that also might not be desirable in some cases due to higher Uu signaling to provide dynamic grants via PDCCH.

In addition to the preceding considerations, distributed systems suffer the issue of priority. The existing systems have trouble in accommodating users with packets with different requirements (in terms of priority, latency, etc.). For example, Mode-4 in LTE V2X allocates resources for transmission based on the priority level at the time of resource selection. Consequently, a packet with high priority arriving in an unpredictable fashion may not be given a resource allocation corresponding to its importance.

Brief Summary of Some Aspects of the Proposed Solutions

Certain aspects of the present disclosure and their embodiments may provide solutions to the aforementioned or other challenges.

There are, proposed herein, various embodiments which address one or more of the issues disclosed herein. In the enclosed embodiments, a method for resource reservation that can adapt to traffic types with varying properties such as packet size, inter-arrival time (at the transmit buffer), priority, etc., is enclosed. The method can be specialized to the cases of re-dimensioning of resource reservation, releasing a reservation, and preempting a reservation.

The invention disclosed herein consists of a method for resource allocation based on the transmission of three messages. The method can be particularized to multiple relevant situations (preemption, re-booking, unbooking, etc.) depending on which UE(s) transmit each of the messages.

Certain embodiments may provide one or more of the following technical advantage(s). Dynamic variations in traffic pattern and packet sizes can be accommodated while keeping the high resource utilization and system efficiency.

The solution can handle multiple related problems (reservation re-dimensioning, unbooking, preemption) using a single framework. That is, it is not necessary to introduce specific mechanisms to solve each of the problems.

SUMMARY

Methods and systems for autonomous sidelink resource allocation are provided.

According to one aspect of the present disclosure, a method performed by at least one wireless device for autonomous sidelink resource allocation comprises: at a first time T1, transmitting a first control message announcing a first reservation of a set of radio resources for sidelink communication; at a second time T2, transmitting a second control message announcing a second reservation of a set of radio resources for sidelink communication; and at a third time T3, performing a sidelink communication using the radio resources reserved by the second reservation.

In some embodiments, performing the sidelink communication comprises transmitting a first data message using the radio resources reserved by the second reservation.

In some embodiments, performing the sidelink communication comprises performing a Vehicle-to-Everything (V2X), communication.

In some embodiments, performing the sidelink communication comprises communicating using the PC5 sidelink interface.

In some embodiments, the set of radio resources reserved by the second reservation and the set of radio resources reserved by the first reservation comprise identical radio resources.

In some embodiments, the set of radio resources reserved by the second reservation comprises a subset of the set of radio resources reserved by the first reservation.

In some embodiments, the set of radio resources reserved by the second reservation comprises a superset of the set of radio resources reserved by the first reservation.

In some embodiments, the set of radio resources reserved by the second reservation and the set of radio resources reserved by the first reservation comprise different radio resources.

In some embodiments, the set of radio resources reserved by the second reservation and the set of radio resources reserved by the first reservation comprise completely different radio resources.

In some embodiments, the second reservation releases at least some of the radio resources reserved by the first reservation.

In some embodiments, the second reservation releases all of the radio resources reserved by the first reservation.

In some embodiments, at least one of the first reservation and the second reservation reserve a set of radio resources that were selected using a resource allocation algorithm, and the method further comprises selecting a set of radio resources using the resource allocation algorithm.

In some embodiments, selecting a set of radio resources using the resource allocation algorithm comprises selecting the set of radio resources using random allocation, using allocation based on carrier sensing, and/or allocation based on detection of unused or available radio resources.

In some embodiments, at least one of the first reservation and the second reservation reserve a set of radio resources according to an instruction from a network node.

In some embodiments, reserving the set of radio resources according to an instruction from the network node comprises reserving the set of radio resources identified by the network node.

In some embodiments, performing the sidelink communication comprises transmitting a third control message announcing a third reservation of a set of radio resources for sidelink communication.

In some embodiments, transmitting the third control message operates as the first control message in another iteration/repetition of the process for performing a sidelink communication.

In some embodiments, the period of time between the repeated sidelink communications is dynamically selected.

In some embodiments, the period of time between the repeated sidelink communication is dynamically selected based on a rate of data arriving at a transmit buffer of the wireless device that is performing the repeated sidelink communication.

In some embodiments, the same wireless device transmits the first control message, transmits the second control message, and performs the sidelink communication.

In some embodiments, the first control message is transmitted by a first wireless device, the first wireless device transmits subsequently cancels the first reservation, the second control message is transmitted by a second wireless device, and the second wireless device performs the sidelink communication.

In some embodiments, the first control message is transmitted by a first wireless device, the second control message is transmitted by a second wireless device, the second reservation preempts the first reservation, and the second wireless device performs the sidelink communication.

In some embodiments, the second reservation preempts the first reservation based on at least one of a transmission priority, a transmission latency requirement, a transmission type, or a transmission content.

In some embodiments, the first wireless device is notified that it has been preempted by receiving the second control message and determining, based on a content of the second control message, that it has been preempted and therefore should perform a sidelink communication using the set of radio resources reserved by the first reservation.

In some embodiments, the set of radio resources comprises a set of resources in the time and frequency domains.

In some embodiments, the set of radio resources comprises at least one Long Term Evolution (LTE) Physical Resource Block (PRB).

In some embodiments, time T3 is calculated based on a set of parameters, the set of parameters comprising: a minimum inter-arrival time (DMIN) of packets at a wireless device transmit buffer; a delay (D), in the transmission of a previous packet from the time that the previous packet arrived in the buffer to the time that the previous packet was transmitted; and/or a delay budget (B).

In some embodiments, the time until time T3 (T), is calculated according to the formula T=DMIN−D+B.

In some embodiments, the set of radio resources reserved by the first or second reservation comprises one or more sets of radio resources according to a pattern in time, in frequency, or in both time and frequency.

In some embodiments, the pattern is identified using a bitmap specified within the first or second reservation.

In some embodiments, the first or second reservation comprises information that: indicates the start of a repeating pattern; indicates the end of a repeating pattern; indicates that a repeating pattern should start or continue; indicates that a repeating pattern should stop; indicates the selection of a new pattern; and/or indicates a modification to a pattern or to the use of a pattern.

According to another aspect of the present disclosure, a wireless device for performing autonomous sidelink resource allocation comprises one or more processors and memory storing instructions executable by the one or more processors, whereby the wireless device is operable to perform any of the wireless device methods described herein.

In some embodiments, the wireless device further comprises at least one antenna configured to send and receive wireless signals, the at least one antenna being coupled to one or more transceivers, the one or more transceivers comprising at least one transmitter circuit, at least one receiver circuit.

According to another aspect of the present disclosure, a wireless device performs autonomous sidelink resource allocation, the wireless device being adapted to perform any of the wireless device methods described herein.

According to another aspect of the present disclosure, a wireless device performs autonomous sidelink resource allocation, the wireless device comprising one or more modules, operable to perform any of the wireless device methods described herein.

According to another aspect of the present disclosure, a non-transitory computer readable storage medium stores software instructions that when executed by one or more processors of a wireless device cause the wireless device to perform any of the wireless device methods described herein.

According to another aspect of the present disclosure, a computer program comprises instructions which, when executed by at least one processor, cause the at least one processor to perform any of the wireless device methods described herein.

According to another aspect of the present disclosure, a wireless device for performing autonomous sidelink resource allocation comprises: an antenna configured to send and receive wireless signals; radio front-end circuitry connected to the antenna and to processing circuitry, and configured to condition signals communicated between the antenna and the processing circuitry; the processing circuitry being configured to perform any of the wireless device methods described herein; an input interface connected to the processing circuitry and configured to allow input of information into the wireless device to be processed by the processing circuitry; an output interface connected to the processing circuitry and configured to output information from the wireless device that has been processed by the processing circuitry; and a battery connected to the processing circuitry and configured to supply power to the wireless device.

According to another aspect of the present disclosure, a communication system includes a host computer that comprises: processing circuitry configured to provide user data; and a communication interface configured to forward the user data to a cellular network for transmission to a wireless device; wherein the cellular network comprises a base station having a radio interface and processing circuitry.

In some embodiments, the communication system further includes the base station.

In some embodiments, the communication system further includes the wireless device, wherein the wireless device is configured to communicate with the base station.

In some embodiments, the processing circuitry of the host computer is configured to execute a host application, thereby providing the user data; and the wireless device comprises processing circuitry configured to execute a client application associated with the host application.

According to another aspect of the present disclosure, a method implemented in a communication system including a host computer, a base station, and a wireless device comprises: at the host computer, providing user data; and at the host computer, initiating a transmission carrying the user data to the wireless device via a cellular network comprising the base station.

In some embodiments, the method further includes, at the base station, transmitting the user data.

In some embodiments, the user data is provided at the host computer by executing a host application, the method further comprising, at the wireless device, executing a client application associated with the host application.

According to another aspect of the present disclosure, a wireless device is configured to communicate with a base station, the wireless device comprising a radio interface and processing circuitry configured to perform any of the wireless device methods described herein.

According to another aspect of the present disclosure, a communication system includes a host computer comprising: processing circuitry configured to provide user data; and a communication interface configured to forward user data to a cellular network for transmission to a wireless device; wherein the wireless device comprises a radio interface and processing circuitry, the wireless device's components configured to perform any of the wireless device methods described herein.

In some embodiments, the cellular network further includes a base station configured to communicate with the wireless device.

In some embodiments, the processing circuitry of the host computer is configured to execute a host application, thereby providing the user data; and the wireless device's processing circuitry is configured to execute a client application associated with the host application.

According to another aspect of the present disclosure, a method, implemented in a communication system including a host computer, a base station, and a wireless device, comprises: at the host computer, providing user data; and at the host computer, initiating a transmission carrying the user data to the wireless device via a cellular network comprising the base station, wherein the wireless device performs any of the wireless device methods described herein.

In some embodiments, the method further comprises, at the wireless device, receiving the user data from the base station.

According to another aspect of the present disclosure, a communication system includes a host computer comprising: communication interface configured to receive user data originating from a transmission from a wireless device to a base station; wherein the wireless device comprises a radio interface and processing circuitry, the wireless device's processing circuitry configured to perform any of the wireless device methods described herein.

In some embodiments, the communication system further includes the wireless device.

In some embodiments, the communication system further includes the base station, wherein the base station comprises a radio interface configured to communicate with the wireless device and a communication interface configured to forward to the host computer the user data carried by a transmission from the wireless device to the base station.

In some embodiments, the processing circuitry of the host computer is configured to execute a host application; and the wireless device's processing circuitry is configured to execute a client application associated with the host application, thereby providing the user data.

In some embodiments, the processing circuitry of the host computer is configured to execute a host application, thereby providing request data; and the wireless device's processing circuitry is configured to execute a client application associated with the host application, thereby providing the user data in response to the request data.

According to another aspect of the present disclosure, a method, implemented in a communication system including a host computer, a base station, and a wireless device, comprises: at the host computer, receiving user data transmitted to the base station from the wireless device, wherein the wireless device performs any of the wireless device methods described herein.

In some embodiments, the method further comprises: at the wireless device, providing the user data to the base station.

In some embodiments, the method further comprises: at the wireless device, executing a client application, thereby providing the user data to be transmitted; and at the host computer, executing a host application associated with the client application.

In some embodiments, the method further comprises: at the wireless device, executing a client application; and at the wireless device, receiving input data to the client application, the input data being provided at the host computer by executing a host application associated with the client application; wherein the user data to be transmitted is provided by the client application in response to the input data.

According to another aspect of the present disclosure, a communication system includes a host computer comprising a communication interface configured to receive user data originating from a transmission from a wireless device to a base station, wherein the base station comprises a radio interface and processing circuitry.

In some embodiments, the communication system further includes the base station.

In some embodiments, the communication system further includes the wireless device, wherein the wireless device is configured to communicate with the base station.

In some embodiments, the processing circuitry of the host computer is configured to execute a host application; and the wireless device is configured to execute a client application associated with the host application, thereby providing the user data to be received by the host computer.

According to another aspect of the present disclosure, a method, implemented in a communication system including a host computer, a base station, and a wireless device, comprises: at the host computer, receiving, from the base station, user data originating from a transmission which the base station has received from the wireless device, wherein the wireless device performs any of the wireless device methods described herein.

In some embodiments, the method further comprises, at the base station, receiving the user data from the wireless device.

In some embodiments, the method further comprises, at the base station, initiating a transmission of the received user data to the host computer.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 16 is a flowchart illustrating a method implemented in a communication system, in accordance with some embodiments of the present disclosure;

FIG. 17 is a flowchart illustrating a method implemented in a communication system, in accordance with other embodiments of the present disclosure;

FIG. 18 is a flowchart illustrating a method implemented in a communication system, in accordance with other embodiments of the present disclosure; and FIG. 19 is a flowchart illustrating a method implemented in a communication system, in accordance with other embodiments of the present disclosure.

DETAILED DESCRIPTION

Methods and systems for autonomous sidelink resource allocation are provided. The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) Base Station (gNB) in a Third Generation Partnership Project (3GPP) Fifth Generation (5G) NR network or an evolved or enhanced Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network (PDN) Gateway (PGW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 1:
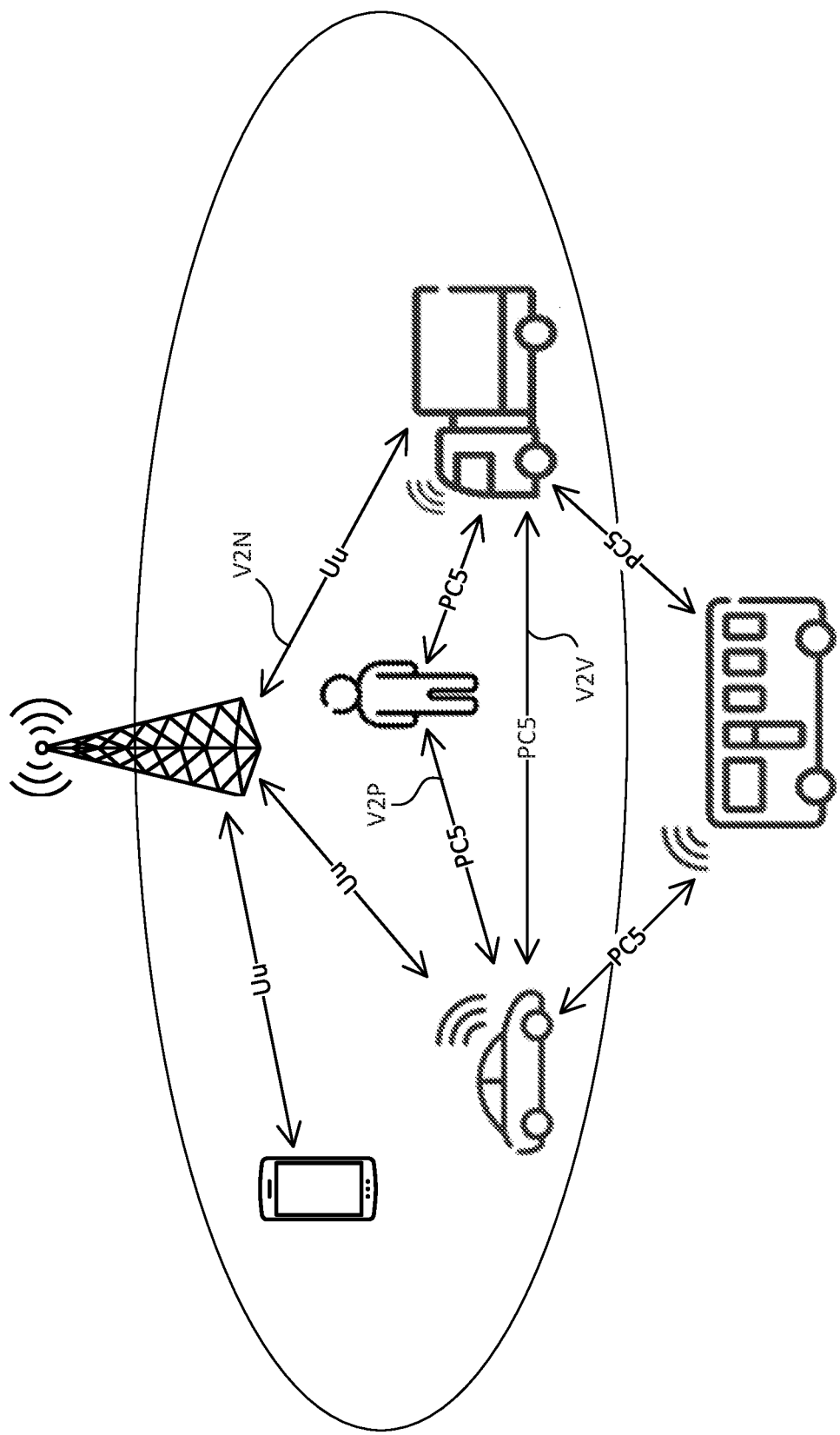
FIG. 1 illustrates some Vehicle-to-Everything (V2X) applications within a conventional LTE-based network.
Figure 2:
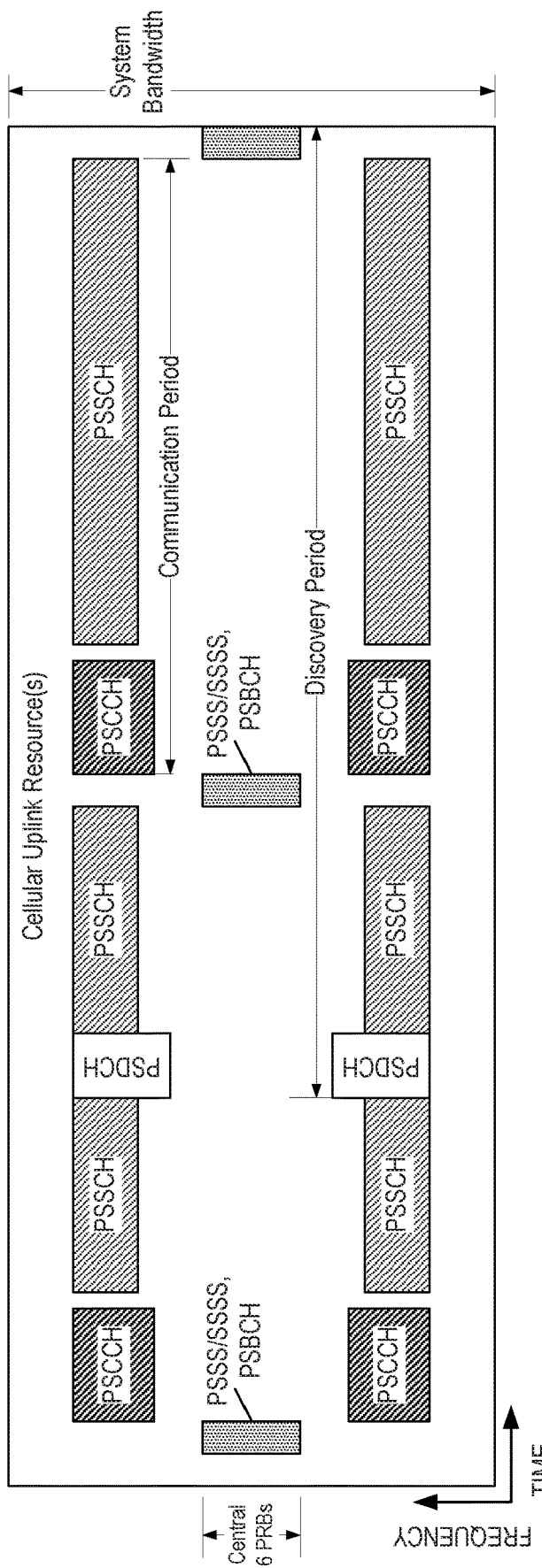
FIG. 2 illustrates an example of cellular uplink resources that are used for sidelink communication.
Figure 3:
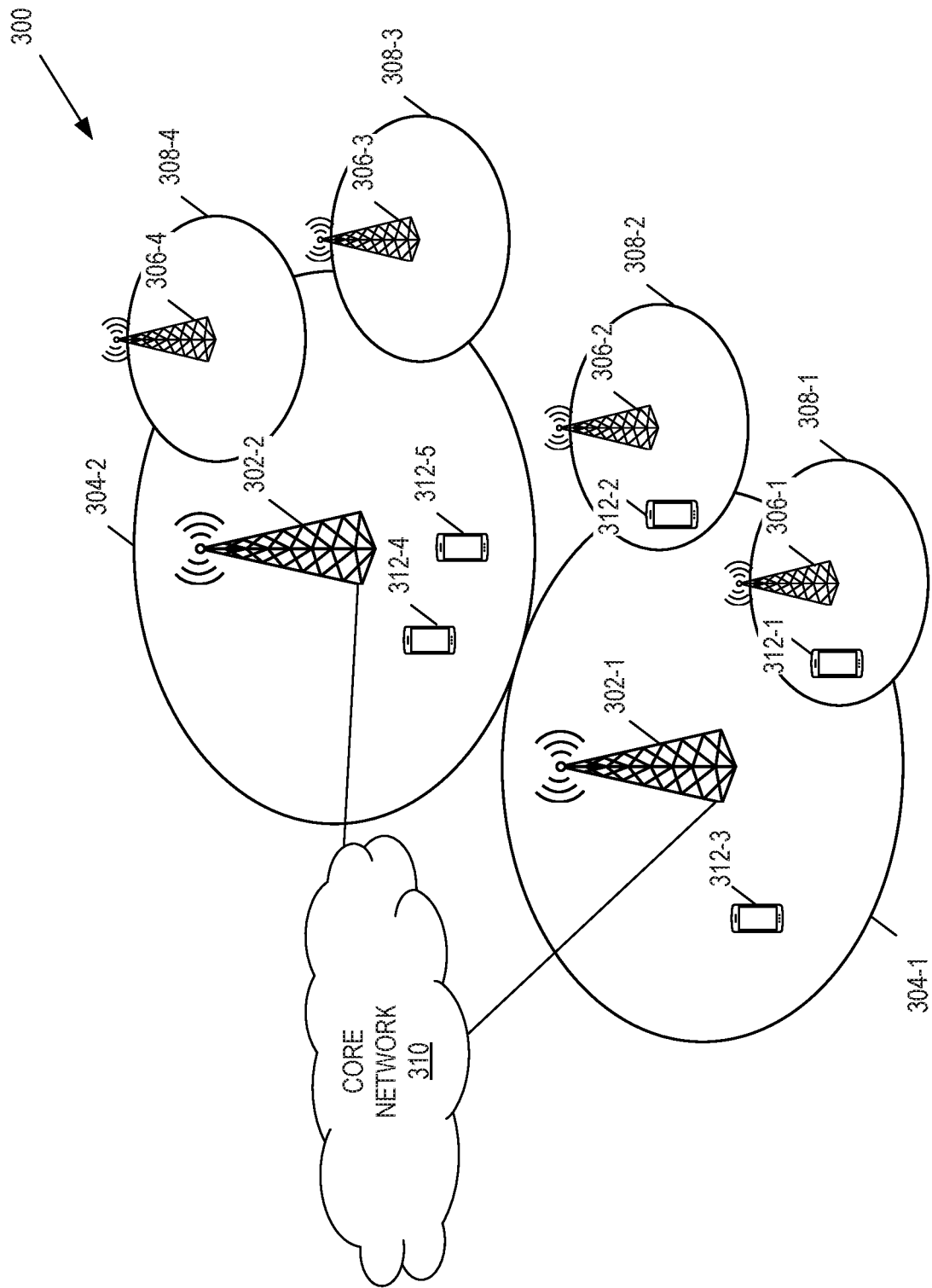
FIG. 3 illustrates one example of a cellular communications network according to some embodiments of the present disclosure.

FIG. 3 illustrates one example of a cellular communications network 300 according to some embodiments of the present disclosure. In the embodiments described herein, the cellular communications network 300 is a 5G NR network. In this example, the cellular communications network 300 includes base stations 302-1 and 302-2, which in LTE are referred to as eNBs and in 5G NR are referred to as gNBs, controlling corresponding macro cells 304-1 and 304-2. The base stations 302-1 and 302-2 are generally referred to herein collectively as base stations 302 and individually as base station 302, and may also be referred to as a Radio Access Network (RAN) 302. Likewise, the macro cells 304-1 and 304-2 are generally referred to herein collectively as macro cells 304 and individually as macro cell 304. The cellular communications network 300 may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The base stations 302 (and optionally the low power nodes 306) are connected to a core network 310.

The base stations 302 and the low power nodes 306 provide service to wireless devices 312-1 through 312-5 in the corresponding cells 304 and 308. The wireless devices 312-1 through 312-5 are generally referred to herein collectively as wireless devices 312 and individually as wireless device 312. The wireless devices 312 are also sometimes referred to herein as UEs.

Figure 4:
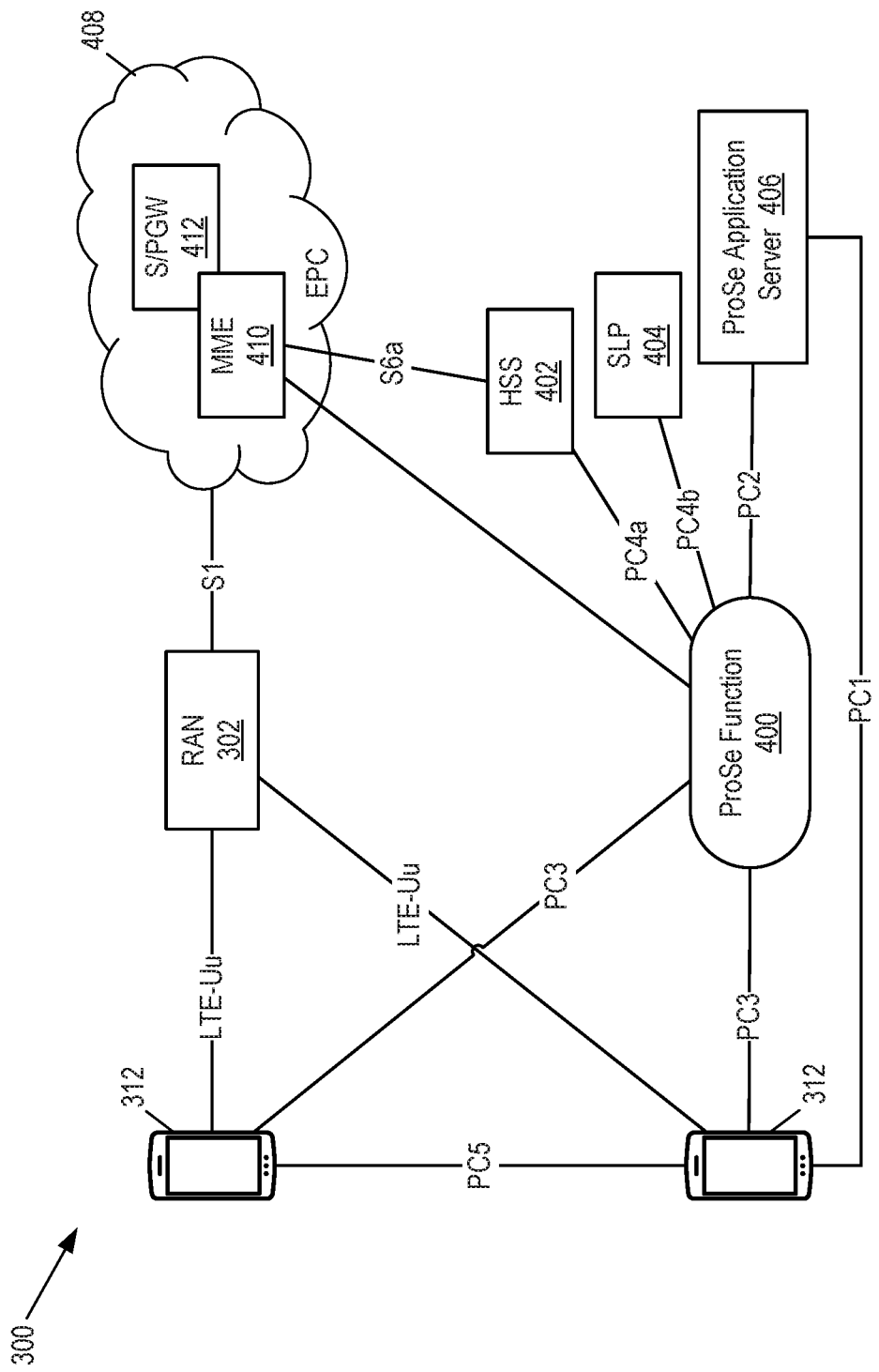
FIG. 4 illustrates a wireless communication system represented as a Fifth Generation (5G) network architecture composed of core Network Functions (NFs), where interaction between any two NFs is represented by a point-to-point reference point/interface.

FIG. 4 illustrates a wireless communication system 300 represented as a 5G network architecture composed of core Network Functions (NFs), where interaction between any two NFs is represented by a point-to-point reference point/interface. FIG. 4 can be viewed as one particular implementation of the system 300 of FIG. 3.

Seen from the access side the 5G network architecture shown in FIG. 4 comprises a plurality of UEs 312 connected to a cellular communications network, specifically the RAN 302, e.g., a Universal Terrestrial Radio Access Network (UTRAN) or an Evolved UTRAN (E-UTRAN), via an LTE-Uu interface. Typically, the RAN 302 comprises base stations such as, e.g., eNBs, gNBs, or similar. The UEs 312 may also be connected to a Proximity Services (ProSe) Function 400 via a PC3 interface. The UEs 312 may communicate with each other directly, e.g., D2D communication, over the PC5 interface.

In the embodiment illustrated in FIG. 4, the ProSe Function 400 communicates with other components via dedicated interfaces, such as: interface PC4a between the ProSe Function 400 and a Home Subscriber Server (HSS) 402; interface PC4b between the ProSe Function 400 and a Secure user plane Location Platform (SLP) 404; and interface PC2 between the ProSe Function 400 and a ProSe Application Server 406. Interface PC1 is used for communication between the UE 312 and the ProSe Application Server 406. In the embodiment illustrated in FIG. 4, the RAN 302 communicates with an Evolved Packet Core (EPC) 408 via the S1 interface. The EPC 408 includes a MME 410 and a Serving Gateway (SGW)/PGW 412, which the ProSe Function 400 may access. The HSS 402 communicates with the MME 410 via the S6a interface.

The subject matter of the present disclosure includes a method for indicating the utilization of resources based on the transmission of multiple reservation messages. An example method is shown in FIG. 5.

Figure 5:
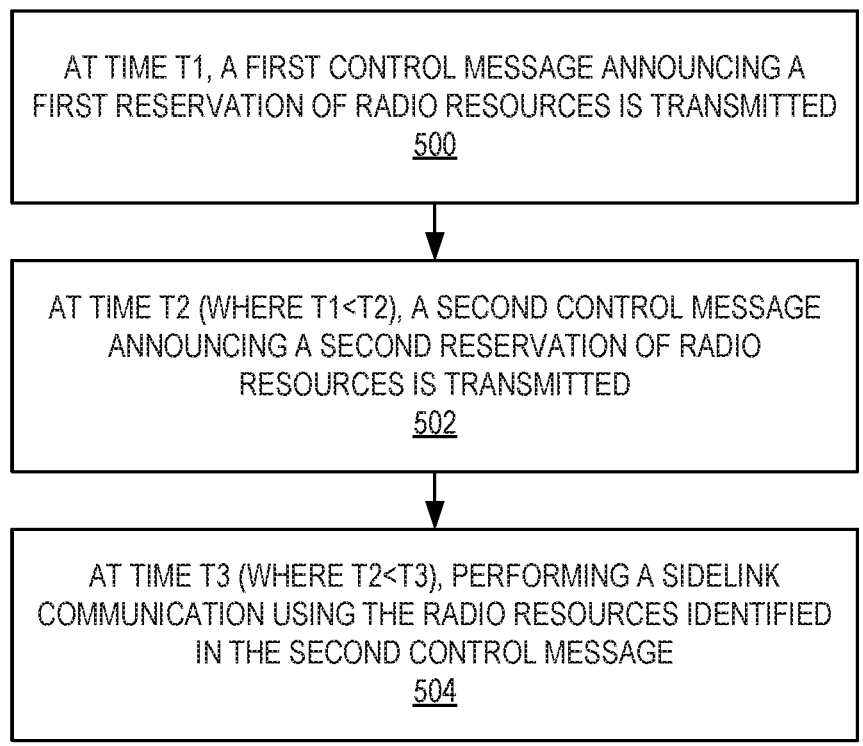
FIG. 5 illustrates a process for autonomous sidelink resource allocation according to some embodiments of the present disclosure.

FIG. 5 illustrates a process for autonomous sidelink resource allocation according to some embodiments of the present disclosure. In the embodiment illustrated in FIG. 5, the process includes the following steps, with figure element numbers in parentheses:

Step 1 (element 500): at time T1, a UE announces a first reservation of radio resources by transmitting a first control message.

Step 2 (element 502): at time T2 (where T1<T2), a UE announces a second reservation of a radio resource, which may or may not be contained in the first reservation, by transmitting a second control message.

Step 3 (element 504): at time T3 (where T2<T3), a UE performs a sidelink communication (e.g., transmitting a first data message) using the radio resources reserved by the second reservation.

In one embodiment, each step of the method above is performed by the same UE. In other embodiments, the steps of the method may be performed by more than one UE. For example, in one embodiment, each of the three steps may be performed by a different UE. In other embodiments, one UE may perform a subset of the steps and another UE may perform the remaining steps, and so on. The following describes different embodiments of the subject matter of the present disclosure depending on the relationship between the UEs involved in each step.

General Considerations about the Method

We first describe some general considerations that may apply to any of the embodiments below.

In some cases, the transmission in Step 3 consists of two transmissions: a control message and the data message, where the control message contains information that is essential for decoding the data message. It may also happen that this control message contains information that is pointing to the future resource reservation and act as 'first control message' as described above in the method.

In some cases, a resource allocation algorithm is applied to select the resources signaled in any of the reservations. For example, to select the resources signaled in the first reservation, a UE may apply a resource allocation method such as: random allocation, allocation based on carrier sensing (e.g., carrier sense multiple access), allocation based on sensing (like in LTE Vehicle-to-Everything (V2X) Mode 4), etc.

In some cases, the resource reservation is performed in response to a command from a network node (e.g., a gNB). For example, in Step 1 and/or Step 2, the UE that transmits the control message may reserve the resources indicated to it by the eNB. This applies to the various types of reservation messages described below (e.g., reservation re-dimension messages, preemption messages, unbooking messages, etc.).

In some cases, the messages may be transmitted using a transmission format that is shorter than usual (e.g., using a mini slot). For example, time T2 may correspond to a first part of a slot and the second reservation may be transmitted using a mini slot, and time T3 may correspond to a second part of the same slot and the first data message may be transmitted using a mini slot.

Embodiment 1: Adapting Resource Reservation

Figure 6A:
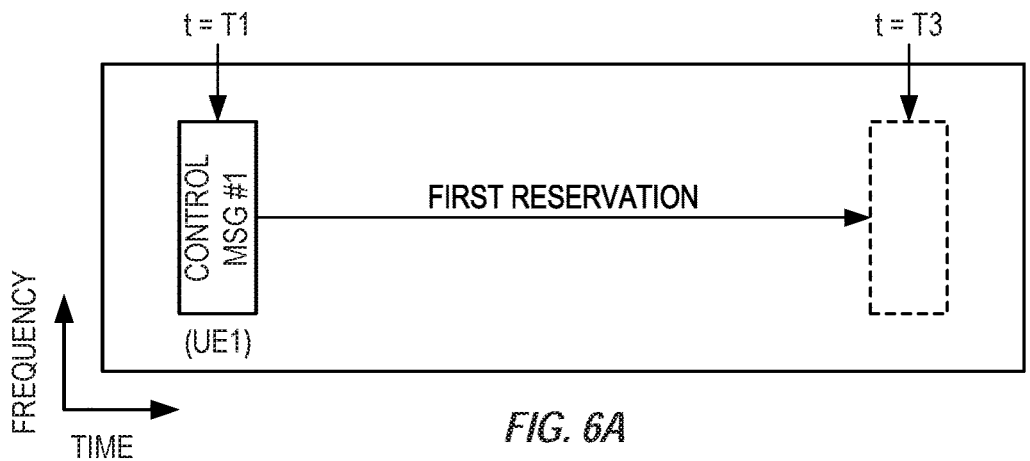
FIGS. 6A, 6B, and 6C illustrate the steps of a process for autonomous sidelink resource allocation according to some embodiments of the present disclosure.
Figure 6B:
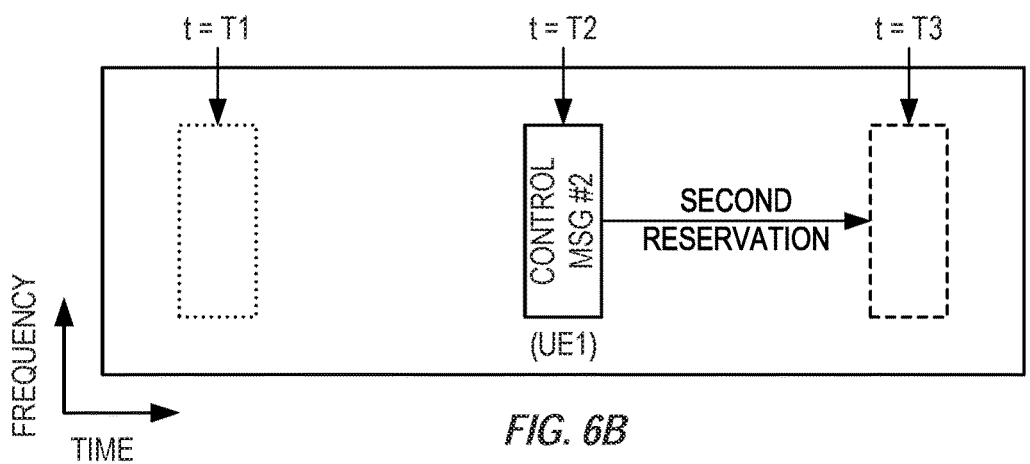
Figure 6C:
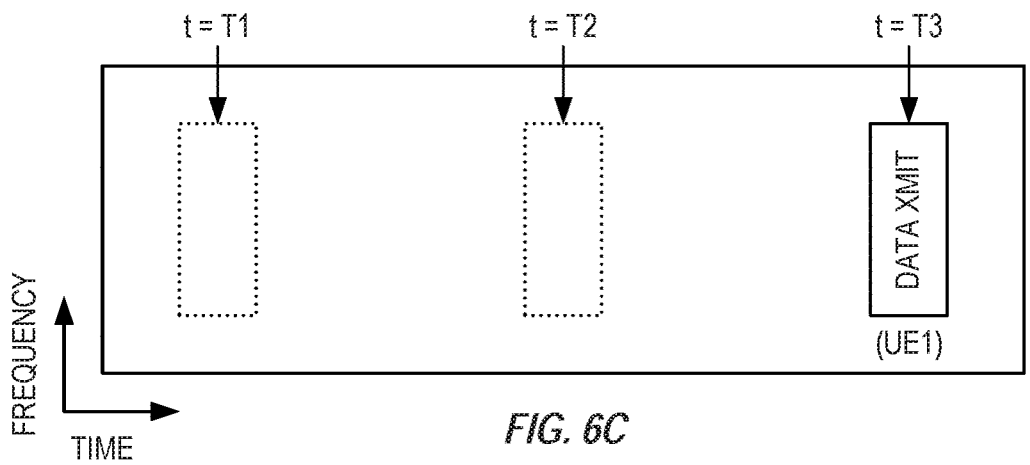

FIGS. 6A, 6B, and 6C illustrate the steps of a process for autonomous sidelink resource allocation according to some embodiments of the present disclosure. In this embodiment, all steps are performed by the same UE, e.g., UE1. For this embodiment, the method is specialized as follows:
 Step 1: at time T1, the UE announces a first reservation of radio resources by transmitting a first control message. The reserved radio resources are for a transmission at time T3. This is shown in FIG. 6A.
 Step 2: at time T2, the UE sends a second reservation. This is shown in FIG. 6B. We distinguish the following cases:
  a) Confirm. The resources signaled in the second reservation coincide with the resources signaled in the first reservation. That is, the UE is confirming its initial reservation for the concerned time/frequency resources.
  b) Decrease. The resources signaled in the second reservation are a subset of the resources signaled in the first reservation. That is, the UE is confirming only part of its initial reservation and releasing the remaining resources (e.g., for the same slot previously reserved).
  c) Increase. The resources signaled in the second reservation are a superset of the resources signaled in the first reservation. That is, the UE is confirming its initial reservation and reserving further resources in one or more later subframes.
  d) Replace. The resources signaled in the second reservation are completely different than the resources signaled in the first reservation. For example, the UE may confirm transmission in the same slot but indicates a different frequency allocation, or it may indicate different frequency allocation than previous reservation in different subframe.
  e) Cancel. The second reservation is used to un-reserve the resources signaled in the first reservation without necessarily reserving any further resource, in which case the set of reserved time/frequency resources is empty.
 Step 3: at time T3, the UE transmits a first data message using the radio resources signaled in the second reservation. This is shown in FIG. 6C.

Embodiment 2: Unbooking

FIGS. 7A, 7B, 7C, and 7D illustrate the steps of a process for autonomous sidelink resource allocation according to some embodiments of the present disclosure. In this embodiment, not all of the steps are performed by just one UE: instead, some of the steps are performed by a first UE (UE1) and the remaining steps are performed by another UE (UE2).

Figure 7A:
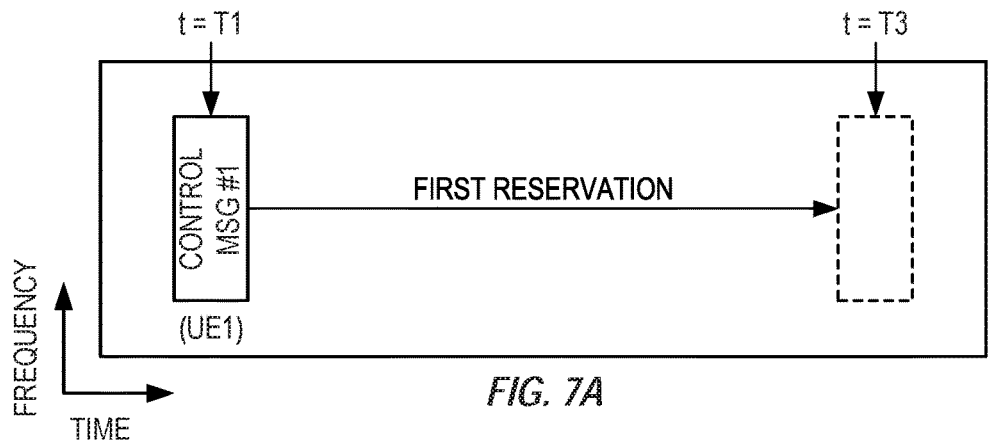
FIGS. 7A, 7B, 7C, and 7D illustrate the steps of a process for autonomous sidelink resource allocation according to some embodiments of the present disclosure.
Figure 7B:
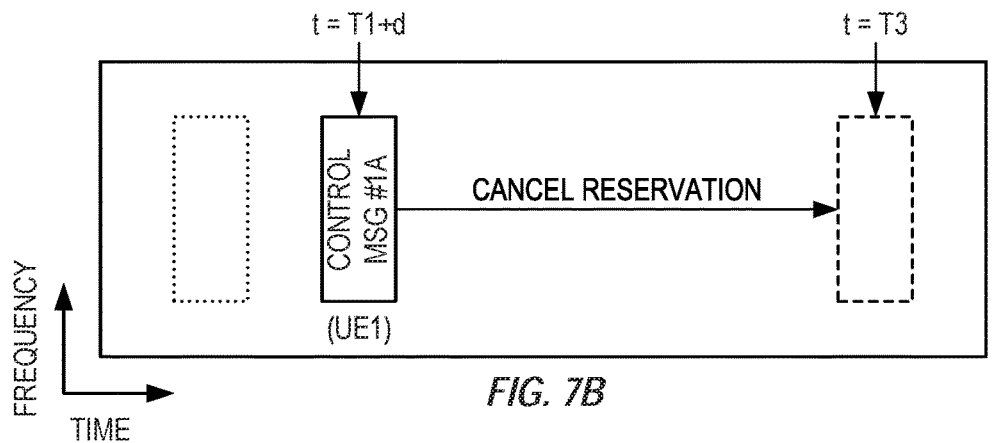
Figure 7C:
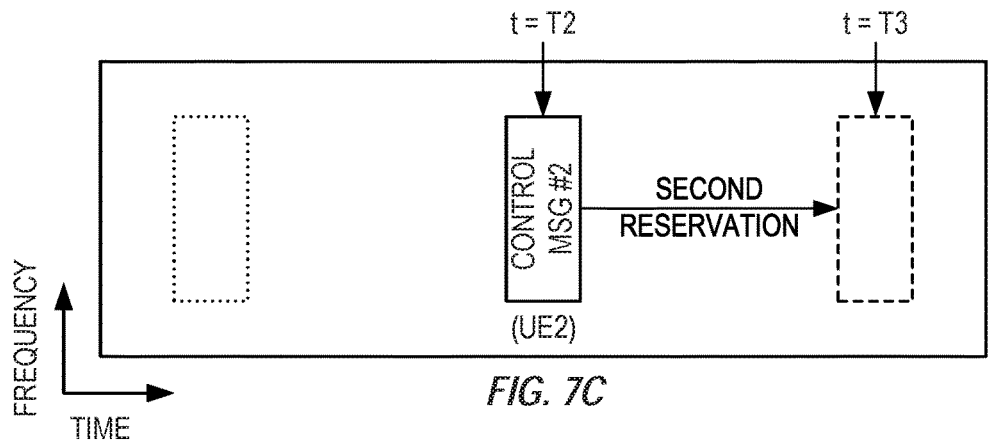
Figure 7D:
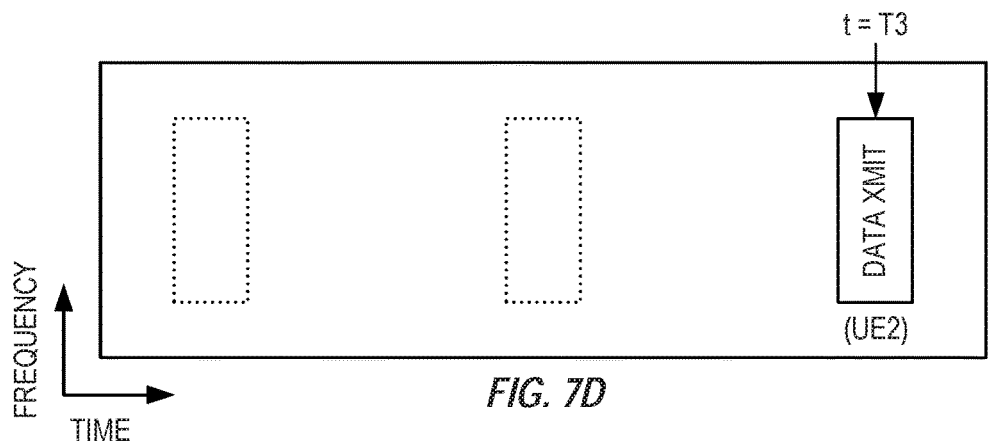

For this embodiment, the method is specialized as follows:
 Step 1: at time T1, UE1 announces a first reservation of radio resources by transmitting a first control message. This is shown in FIG. 7A. The reserved radio resources are for a transmission at time T3.
  At time T1+d, UE1 sends another control message to cancel the first reservation. That is, UE1 is notifying the other UEs that UE1 will not make use of the reserved resources. This is shown in FIG. 7B.
 Step 2: at time T2, UE2 transmits its control message to either update its already reserved resources or make a new reservation. This is shown in FIG. 7C.
 Step 3: at time T3, UE2 transmits a first data message using the radio resources signaled in the second reservation. This is shown in FIG. 7D.

In the description above, the control message shown in FIG. 7C, rather than the control message shown in FIG. 7B, is considered "Step 2." It should be noted, however, that in another embodiment, the second control message sent by UE1 in FIG. 7B could have arrived at time T2 while the control message sent by UE2 in FIG. 7C could have arrived at time T2+d, in which case the control message shown in FIG. 7B, rather than the control message sent in FIG. 7C, could be considered "Step 2."

Embodiment 3: Preemption

Figure 8A:
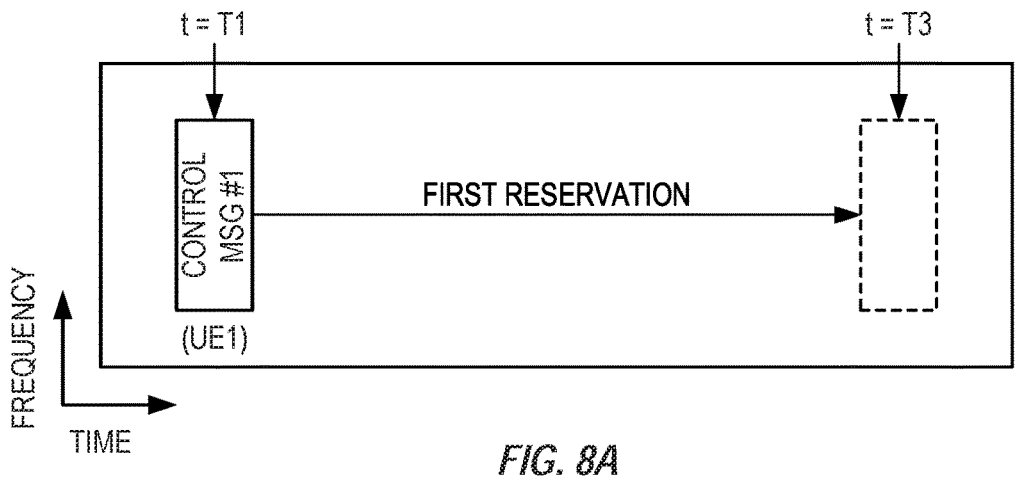
FIGS. 8A, 8B, and 8C illustrate the steps of a process for autonomous sidelink resource allocation according to some embodiments of the present disclosure.
Figure 8B:
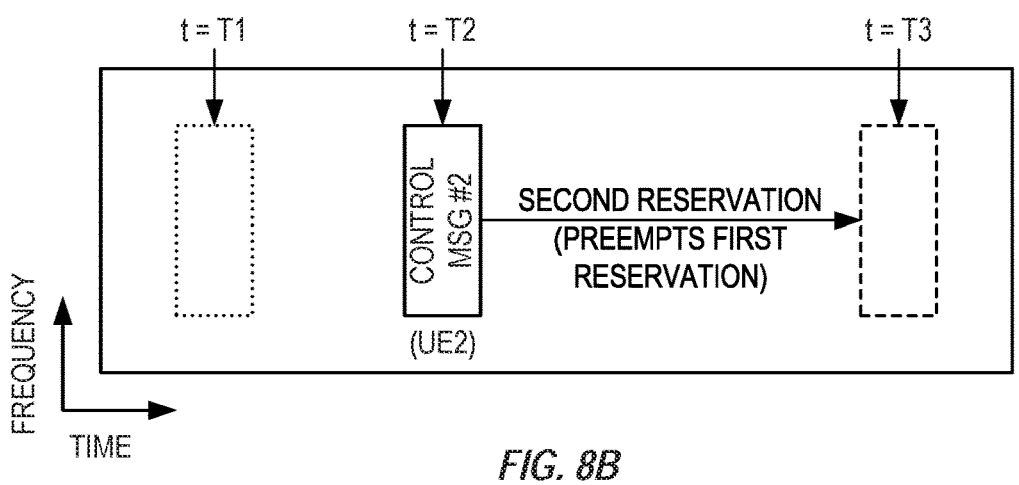
Figure 8C:
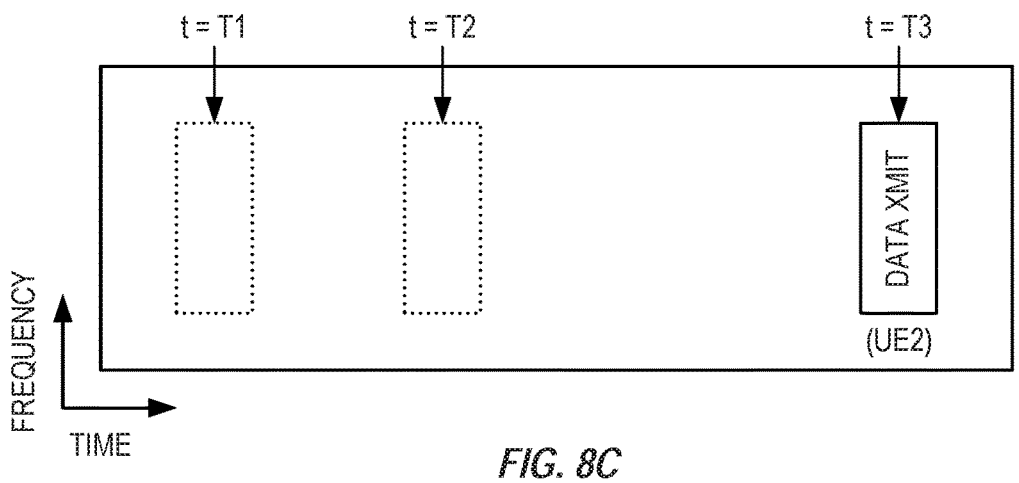

FIGS. 8A, 8B, and 8C illustrate the steps of a process for autonomous sidelink resource allocation according to some embodiments of the present disclosure. In this embodiment, Step 1 is performed by UE1 and Steps 2 and 3 are performed by UE2.

For this embodiment, the method is specialized as follows:
 Step 1: at time T1, UE1 announces a first reservation of radio resources by transmitting a first control message. The reserved radio resources are for a transmission at time T3. This is shown in FIG. 8A.
 Step 2: at time T2, UE2 sends a second control message (i.e., second reservation) overriding the first reservation by UE1. That is, UE2 is notifying UE1 that its reservation of resources has been cancelled (i.e., UE1 has been preempted). The resources contained in the second reservation may be the same as in the first reservation, or a subset/superset of the resources in the first reservation.

Step 3: at time T3, UE2 transmits a first data message using the radio resources signaled in the second reservation.

In some embodiments, preemption of a reserved transmission may only be possible in specific cases. For example, in some embodiments, only transmission of important (e.g., with higher priority, with lower latency requirement, etc.) messages may be allowed to preempt other transmissions. For example, in some embodiments, preemption may only be possible in order of importance: a low priority transmission may not be allowed to preempt a higher priority transmission, etc. In some embodiments, the second control message may be transmitted in one or more symbols with the same slot or subframe in which there are previously reserved radio resources. For example, at the beginning of each slot there can be one (or more) symbols reserved that can be used to transmit the second control message. In some cases, T2 and T3 correspond to different symbols in the same slot. The idea is that the unbooking signal can be transmitted in a mini slot fashion in the same slot in which resources for data transmissions have been previously reserved.

Embodiment 4: Repeated Application of the Method

This embodiment consists of the repeated application of any of the other embodiments. For this purpose, the transmission in Step 3 carries a further reservation. In other words, the transmission in Step 3 becomes Step 1 for a new application of the method.

In some cases, the repeated application of the method may be used to adapt the reservations to the changes in rate of arrival (to the transmit buffer) of the packets. For example, in a first application of the method, the value of T3 may be chosen such that the length of time between T1 and T3 (or between T2 and T3) is relatively long, while in a second application of the method, the value of T3 may be chosen such that the length of time between T1 and T3 (or between T2 and T3) is relatively short, e.g., responsive to receiving packets at the transmit buffer at a higher rate than before.

Embodiment 5: Reservation Values

In some cases, T3 is calculated based on the following parameters: (1) minimum inter-arrival time dmin (to the transmit buffer) between packets for a particular traffic type or service; (2) the delay D in the transmission of the previous packet from the time it arrives in the buffer to its actual transmission; and (3) the delay budget d. Therefore, the time to next resource booking will be given as:

$$T = d\ min - D + d$$

In some cases, a reservation may consist of multiple resources in time and/or frequency. For example, multiple resource blocks may be reserved for a given slot, or multiple slots may be reserved for a given resource block.

In some cases, a reservation may consist of a pattern of resources. That is, the reservation indicates a group of resources that is repeated in frequency or in time, possibly within a certain interval. For example, such reservation pattern may be represented through a bitmap of subframes in which the pattern applies and set of frequency resources, or by a timer which indicates the time interval in which the set of time/frequency resources can be kept by a UE. The amount of time/frequency resources within a given pattern may depend on the specific traffic/Quality of Service (QoS) profile the UE is transmitting, e.g., associated with a certain logical channel identity by the network configuration.

In such cases, the previous embodiments may be used to indicate (e.g., in the second reservation signal at time T2 before a new pattern starts at time T3) whether the UE keeps using such pattern (e.g., starting from time T3), stops using such pattern (e.g., at the end of the pattern duration or at the time of the reception of the second reservation signal), or modifies some of the time/frequency resources previously reserved in a first reservation message for the concerned pattern (i.e., it indicates selection of a new pattern to start at time T3).

Example Implementations

Figure 9:
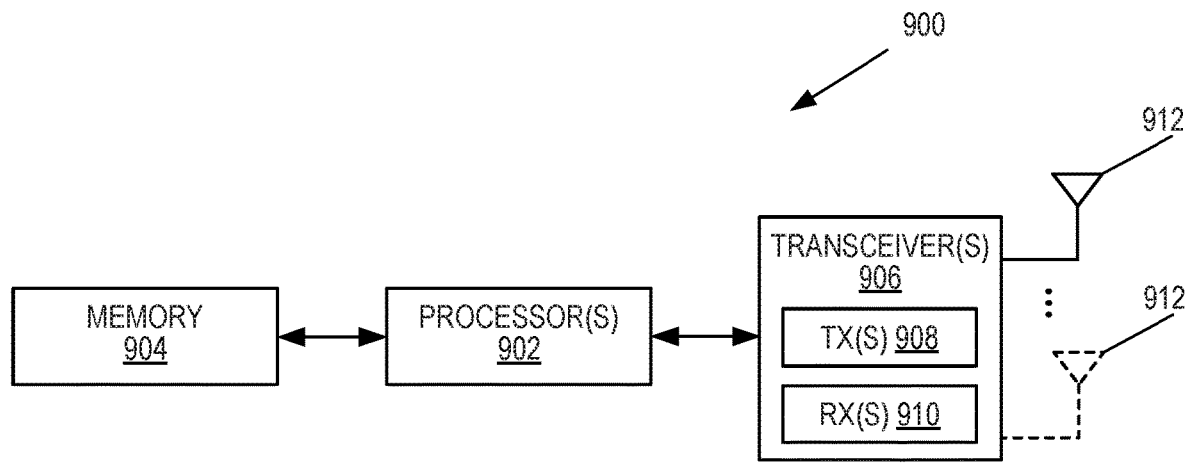
FIG. 9 is a schematic block diagram of a User Equipment (UE) according to some embodiments of the present disclosure.

FIG. 9 is a schematic block diagram of a UE 900 according to some embodiments of the present disclosure. As illustrated, the UE 900 includes one or more processors 902 (e.g., Central Processing Units (CPUs), Application Specific Integrated Circuits (ASICs), Field Programmable Gate Arrays (FPGAs), and/or the like), memory 904, and one or more transceivers 906 each including one or more transmitters 908 and one or more receivers 910 coupled to one or more antennas 912. The transceiver(s) 906 includes radio front-end circuitry connected to the antenna(s) 912 that is configured to condition signals communicated between the antenna(s) 912 and the processor(s) 902, as will be appreciated by on of ordinary skill in the art. The processors 902 are also referred to herein as processing circuitry. The transceivers 906 are also referred to herein as radio circuitry. In some embodiments, the functionality of the UE 900 described above may be fully or partially implemented in software that is, e.g., stored in the memory 904 and executed by the processor(s) 902. Note that the UE 900 may include additional components not illustrated in FIG. 9 such as, e.g., one or more user interface components (e.g., an input/output interface including a display, buttons, a touch screen, a microphone, a speaker(s), and/or the like, and/or any other components for allowing input of information into the UE 900, and/or allowing output of information from the UE 900), and a power supply (e.g., a battery and associated power circuitry), etc.

In some embodiments, a computer program product including instructions which, when executed by at least one processor, causes the at least one processor to carry out the functionality of the UE 900 according to any of the embodiments described herein, is provided. In some embodiments, a carrier comprising the aforementioned computer program product is provided. The carrier is one of an electronic signal, an optical signal, a radio signal, or a computer readable storage medium (e.g., a non-transitory computer readable storage medium such as memory).

Figure 10:
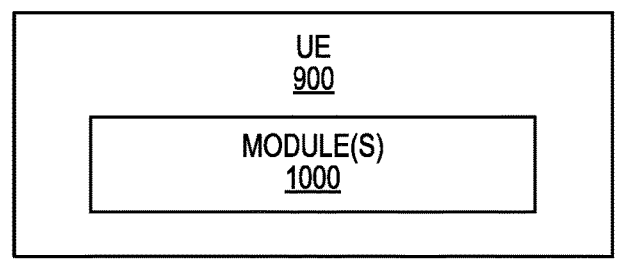
FIG. 10 is a schematic block diagram of the UE according to some other embodiments of the present disclosure.

FIG. 10 is a schematic block diagram of the UE 900 according to some other embodiments of the present disclosure. The UE 900 includes one or more modules 1000, each of which is implemented in software, hardware, firmware, or some combination of the above. The module(s) 1000 provide the functionality of the UE 900 described herein.

Figure 11:
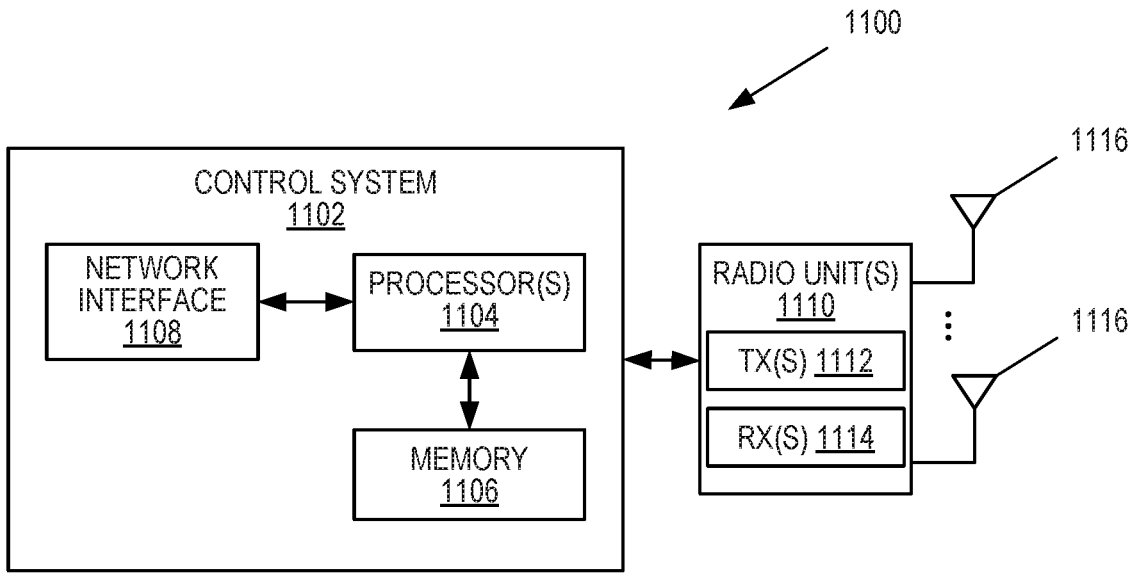
FIG. 11 is a schematic block diagram of a radio access node according to some embodiments of the present disclosure.

FIG. 11 is a schematic block diagram of a radio access node 1100 according to some embodiments of the present disclosure. The radio access node 1100 may be, for example, a base station 302 or 306. As illustrated, the radio access node 1100 includes a control system 1102 that includes one or more processors 1104 (e.g., CPUs, ASICs, FPGAs, and/or the like), memory 1106, and a network interface 1108. The one or more processors 1104 are also referred to herein as processing circuitry. In addition, the radio access node 1100 includes one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein. In some embodiments, the function(s) are implemented in software that is stored, e.g., in the memory 1106 and executed by the one or more processors 1104.

Figure 12:
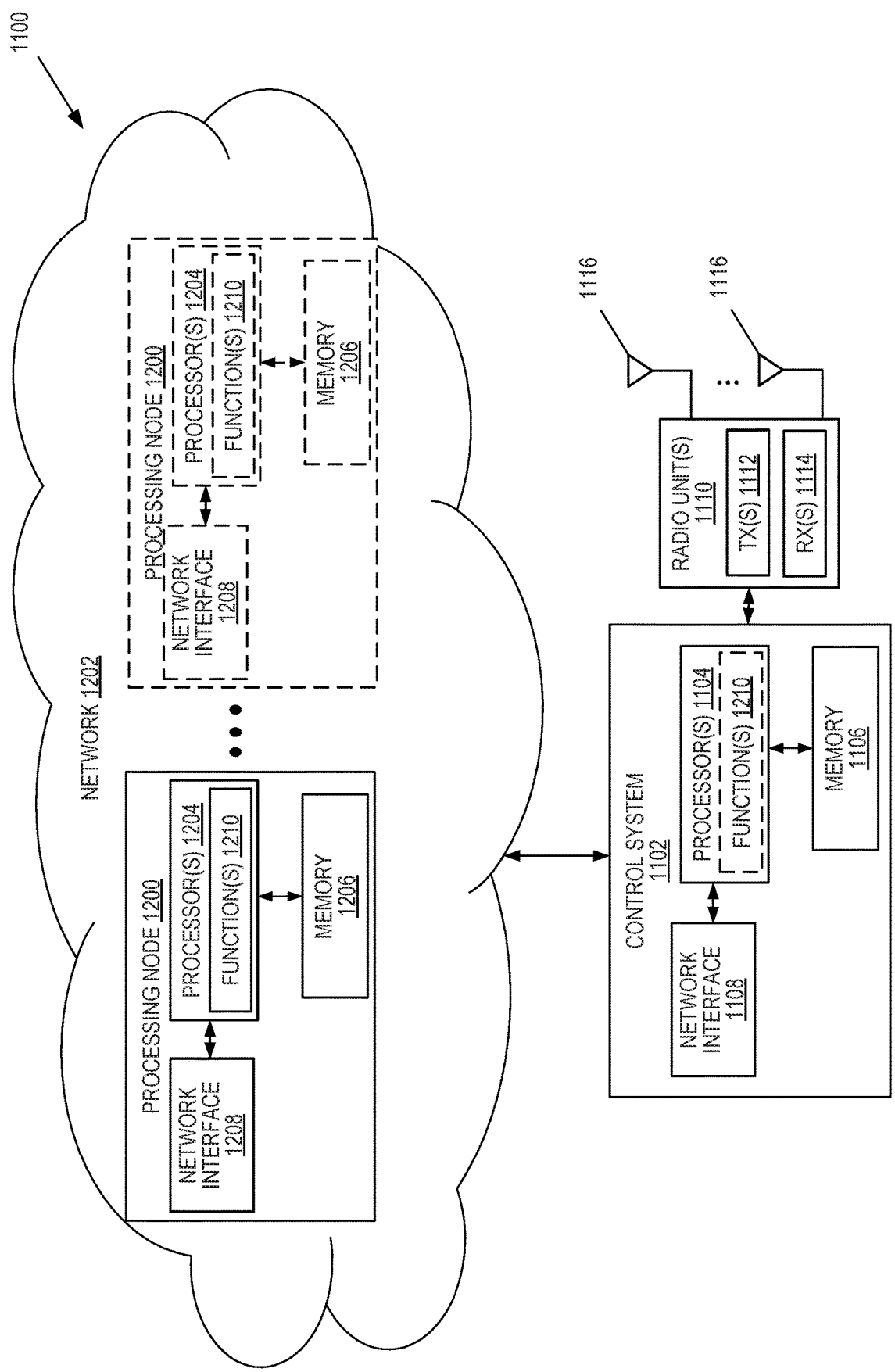
FIG. 12 is a schematic block diagram that illustrates a virtualized embodiment of the radio access node according to some embodiments of the present disclosure.

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 includes the control system 1102 that includes the one or more processors 1104 (e.g., CPUs, ASICs, FPGAs, and/or the like), the memory 1106, the network interface 1108, and the one or more radio units 1110 that each includes the one or more transmitters 1112 and the one or more receivers 1114 coupled to the one or more antennas 1116, as described above. The control system 1102 is connected to the radio unit(s) 1110 via, for example, an optical cable or the like. The control system 1102 is connected to one or more processing nodes 1200 coupled to or included as part of a network(s) 1202 via the network interface 1108. Each processing node 1200 includes one or more processors 1204 (e.g., CPUs, ASICs, FPGAs, and/or the like), memory 1206, and a network interface 1208.

In this example, functions 1210 of the radio access node 1100 described herein are implemented at the one or more processing nodes 1200 or distributed across the control system 1102 and the one or more processing nodes 1200 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicate directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable storage medium such as memory).

Figure 13:
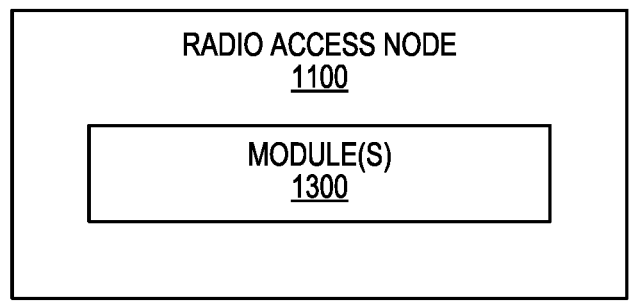
FIG. 13 is a schematic block diagram of the radio access node according to some other embodiments of the present disclosure.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein. This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
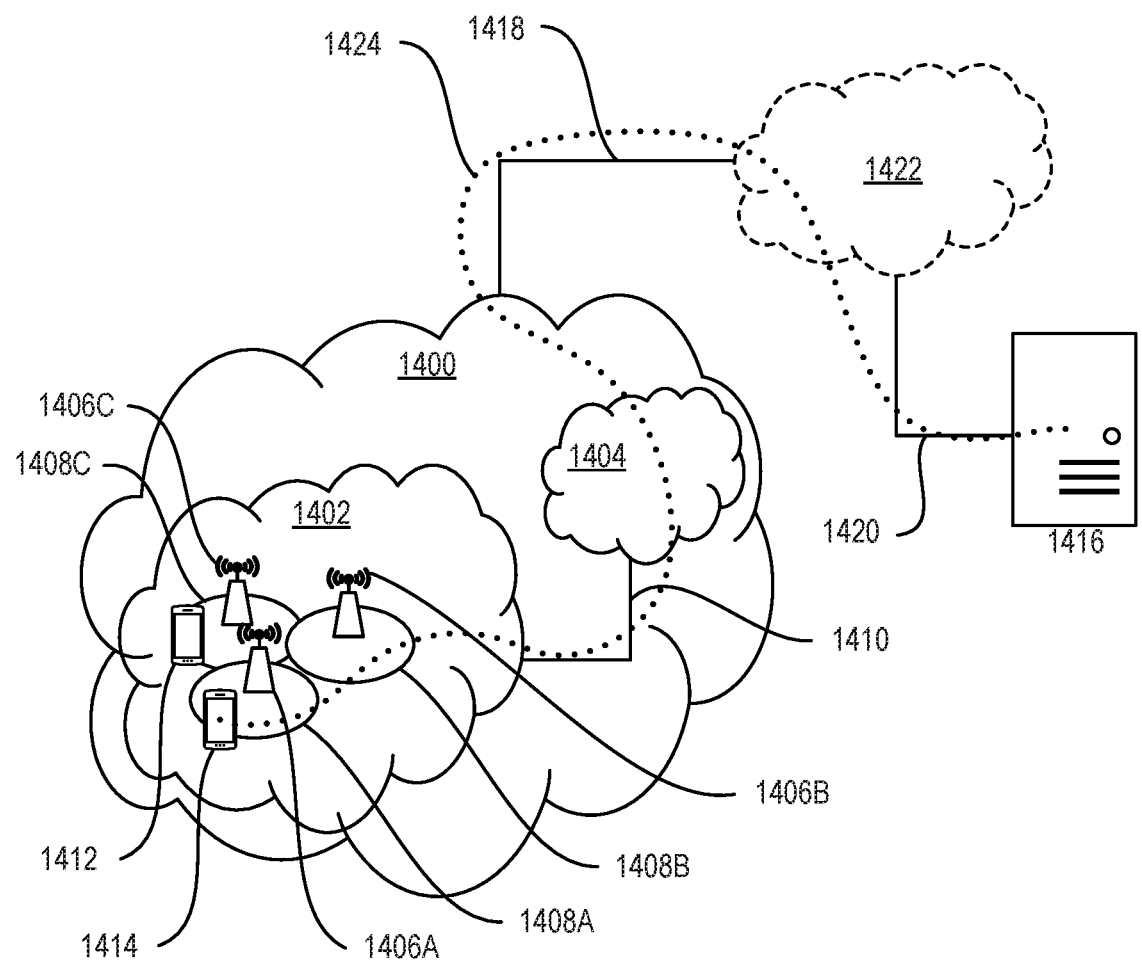
FIG. 14 illustrates a communication system that supports autonomous sidelink resource allocation in accordance with embodiments of the present disclosure.

FIG. 14 illustrates a communication system that supports autonomous sidelink resource allocation in accordance with embodiments of the present disclosure. With reference to FIG. 14, in accordance with an embodiment, a communication system includes a telecommunication network 1400, such as a 3GPP-type cellular network, which comprises an access network 1402, such as a RAN, and a core network 1404. The access network 1402 comprises a plurality of base stations 1406A, 1406B, 1406C, such as NBs, eNBs, gNBs, or other types of wireless Access Points (APs), each defining a corresponding coverage area 1408A, 1408B, 1408C. Each base station 1406A, 1406B, 1406C is connectable to the core network 1404 over a wired or wireless connection 1410. A first UE 1412 located in coverage area 1408C is configured to wirelessly connect to, or be paged by, the corresponding base station 1406C. A second UE 1414 in coverage area 1408A is wirelessly connectable to the corresponding base station 1406A. While a plurality of UEs 1412, 1414 are illustrated in this example, the disclosed embodiments are equally applicable to a situation where a sole UE is in the coverage area or where a sole UE is connecting to the corresponding base station 1406.

The telecommunication network 1400 is itself connected to a host computer 1416, which may be embodied in the hardware and/or software of a standalone server, a cloud-implemented server, a distributed server, or as processing resources in a server farm. The host computer 1416 may be under the ownership or control of a service provider, or may be operated by the service provider or on behalf of the service provider. Connections 1418 and 1420 between the telecommunication network 1400 and the host computer 1416 may extend directly from the core network 1404 to the host computer 1416 or may go via an optional intermediate network 1422. The intermediate network 1422 may be one of, or a combination of more than one of, a public, private, or hosted network; the intermediate network 1422, if any, may be a backbone network or the Internet; in particular, the intermediate network 1422 may comprise two or more sub-networks (not shown).

The communication system of FIG. 14 as a whole enables connectivity between the connected UEs 1412, 1414 and the host computer 1416. The connectivity may be described as an Over-the-Top (OTT) connection 1424. The host computer 1416 and the connected UEs 1412, 1414 are configured to communicate data and/or signaling via the OTT connection 1424, using the access network 1402, the core network 1404, any intermediate network 1422, and possible further infrastructure (not shown) as intermediaries. The OTT connection 1424 may be transparent in the sense that the participating communication devices through which the OTT connection 1424 passes are unaware of routing of uplink and downlink communications. For example, the base station 1406 may not or need not be informed about the past routing of an incoming downlink communication with data originating from the host computer 1416 to be forwarded (e.g., handed over) to a connected UE 1412. Similarly, the base station 1406 need not be aware of the future routing of an outgoing uplink communication originating from the UE 1412 towards the host computer 1416.

Figure 15:
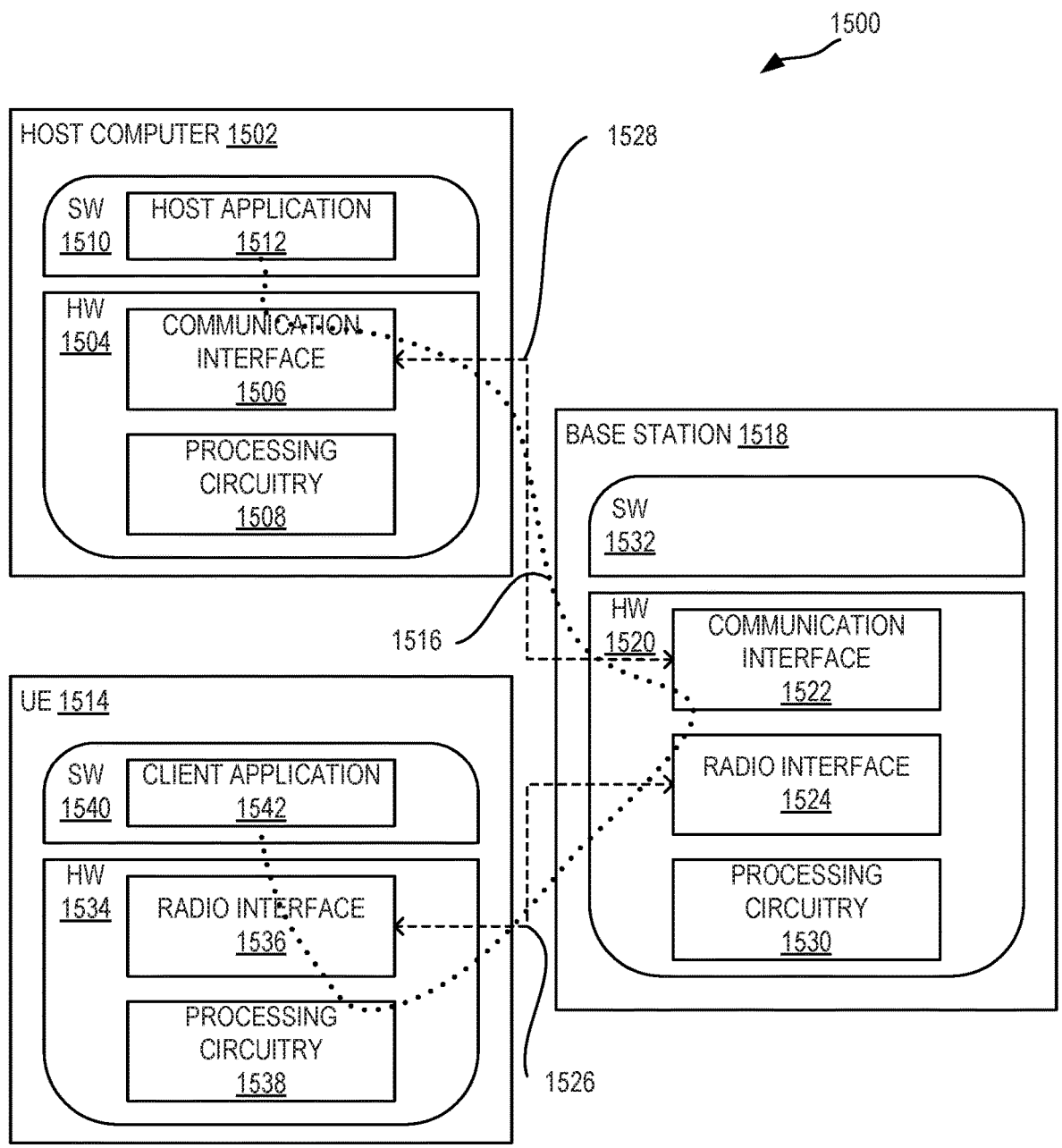
FIG. 15 illustrates a system for autonomous sidelink resource allocation according to other embodiments of the present disclosure.

FIG. 15 illustrates a system for autonomous sidelink resource allocation according to other embodiments of the present disclosure. Example implementations, in accordance with an embodiment, of the UE, base station, and host computer discussed in the preceding paragraphs will now be described with reference to FIG. 15. In a communication system 1500, a host computer 1502 comprises hardware 1504 including a communication interface 1506 configured to set up and maintain a wired or wireless connection with an interface of a different communication device of the communication system 1500. The host computer 1502 further comprises processing circuitry 1508, which may have storage and/or processing capabilities. In particular, the processing circuitry 1508 may comprise one or more programmable processors, ASICs, FPGAs, or combinations of these (not shown) adapted to execute instructions. The host computer 1502 further comprises software 1510, which is stored in or accessible by the host computer 1502 and executable by the processing circuitry 1508. The software 1510 includes a host application 1512. The host application 1512 may be operable to provide a service to a remote user, such as a UE 1514 connecting via an OTT connection 1516 terminating at the UE 1514 and the host computer 1502. In providing the service to the remote user, the host application 1512 may provide user data which is transmitted using the OTT connection 1516.

The communication system 1500 further includes a base station 1518 provided in a telecommunication system and comprising hardware 1520 enabling it to communicate with the host computer 1502 and with the UE 1514. The hardware 1520 may include a communication interface 1522 for setting up and maintaining a wired or wireless connection with an interface of a different communication device of the communication system 1500, as well as a radio interface 1524 for setting up and maintaining at least a wireless connection 1526 with the UE 1514 located in a coverage area (not shown in FIG. 15) served by the base station 1518. The communication interface 1522 may be configured to facilitate a connection 1528 to the host computer 1502. The connection 1528 may be direct or it may pass through a core network (not shown in FIG. 15) of the telecommunication system and/or through one or more intermediate networks outside the telecommunication system. In the embodiment shown, the hardware 1520 of the base station 1518 further includes processing circuitry 1530, which may comprise one or more programmable processors, ASICs, FPGAs, or combinations of these (not shown) adapted to execute instructions. The base station 1518 further has software 1532 stored internally or accessible via an external connection.

The communication system 1500 further includes the UE 1514 already referred to. The UE's 1514 hardware 1534 may include a radio interface 1536 configured to set up and maintain a wireless connection 1526 with a base station serving a coverage area in which the UE 1514 is currently located. The hardware 1534 of the UE 1514 further includes processing circuitry 1538, which may comprise one or more programmable processors, ASICs, FPGAs, or combinations of these (not shown) adapted to execute instructions. The UE 1514 further comprises software 1540, which is stored in or accessible by the UE 1514 and executable by the processing circuitry 1538. The software 1540 includes a client application 1542. The client application 1542 may be operable to provide a service to a human or non-human user via the UE 1514, with the support of the host computer 1502. In the host computer 1502, the executing host application 1512 may communicate with the executing client application 1542 via the OTT connection 1516 terminating at the UE 1514 and the host computer 1502. In providing the service to the user, the client application 1542 may receive request data from the host application 1512 and provide user data in response to the request data. The OTT connection 1516 may transfer both the request data and the user data. The client application 1542 may interact with the user to generate the user data that it provides.

It is noted that the host computer 1502, the base station 1518, and the UE 1514 illustrated in FIG. 15 may be similar or identical to the host computer 1416, one of the base stations 1406A, 1406B, 1406C, and one of the UEs 1412, 1414 of FIG. 14, respectively. This is to say, the inner workings of these entities may be as shown in FIG. 15 and independently, the surrounding network topology may be that of FIG. 14.

In FIG. 15, the OTT connection 1516 has been drawn abstractly to illustrate the communication between the host computer 1502 and the UE 1514 via the base station 1518 without explicit reference to any intermediary devices and the precise routing of messages via these devices. The network infrastructure may determine the routing, which may be configured to hide from the UE 1514 or from the service provider operating the host computer 1502, or both. While the OTT connection 1516 is active, the network infrastructure may further take decisions by which it dynamically changes the routing (e.g., on the basis of load balancing consideration or reconfiguration of the network).

The wireless connection 1526 between the UE 1514 and the base station 1518 is in accordance with the teachings of the embodiments described throughout this disclosure. One or more of the various embodiments improve the performance of OTT services provided to the UE 1514 using the OTT connection 1516, in which the wireless connection 1526 forms the last segment, especially where the last segment comprises a V2X connection. More precisely, the teachings of these embodiments may improve the performance of OTT services to a vehicle via a V2X connection by addressing dynamic variations in traffic patterns and thereby provide benefits such as accommodating variations in traffic patterns and packet sizes while maintaining high resource utilization and system efficiency.

A measurement procedure may be provided for the purpose of monitoring data rate, latency, and other factors on which the one or more embodiments improve. There may further be optional network functionality for reconfiguring the OTT connection 1516 between the host computer 1502 and the UE 1514, in response to variations in the measurement results. The measurement procedure and/or the network functionality for reconfiguring the OTT connection 1516 may be implemented in the software 1510 and the hardware 1504 of the host computer 1502 or in the software 1540 and the hardware 1534 of the UE 1514, or both. In some embodiments, sensors (not shown) may be deployed in or in association with communication devices through which the OTT connection 1516 passes; the sensors may participate in the measurement procedure by supplying values of the monitored quantities exemplified above, or supplying values of other physical quantities from which the software 1510, 1540 may compute or estimate the monitored quantities. The reconfiguring of the OTT connection 1516 may include message format, retransmission settings, preferred routing, etc.; the reconfiguring need not affect the base station 1518, and it may be unknown or imperceptible to the base station 1518. Such procedures and functionalities may be known and practiced in the art. In certain embodiments, measurements may involve proprietary UE signaling facilitating the host computer 1502's measurements of throughput, propagation times, latency, and the like. The measurements may be implemented in that the software 1510 and 1540 causes messages to be transmitted, in particular empty or 'dummy' messages, using the OTT connection 1516 while it monitors propagation times, errors, etc.

FIG. 16 is a flowchart illustrating a method implemented in a communication system, in accordance with some embodiments of the present disclosure. The communication system includes a host computer, a base station, and a UE which may be those described with reference to FIGS. 14 and 15. For simplicity of the present disclosure, only drawing references to FIG. 16 will be included in this section. In step 1600, the host computer provides user data. In sub-step 1602 (which may be optional) of step 1600, the host computer provides the user data by executing a host application. In step 1604, the host computer initiates a transmission carrying the user data to the UE. In step 1606 (which may be optional), the base station transmits to the UE the user data which was carried in the transmission that the host computer initiated, in accordance with the teachings of the embodiments described throughout this disclosure. In step 1608 (which may also be optional), the UE executes a client application associated with the host application executed by the host computer.

FIG. 17 is a flowchart illustrating a method implemented in a communication system, in accordance with some embodiments of the present disclosure. The communication system includes a host computer, a base station, and a UE which may be those described with reference to FIGS. 14 and 15. For simplicity of the present disclosure, only drawing references to FIG. 17 will be included in this section. In step 1700 of the method, the host computer provides user data. In an optional sub-step (not shown) the host computer provides the user data by executing a host application. In step 1702, the host computer initiates a transmission carrying the user data to the UE. The transmission may pass via the base station, in accordance with the teachings of the embodiments described throughout this disclosure. In step 1704 (which may be optional), the UE receives the user data carried in the transmission.

FIG. 18 is a flowchart illustrating a method implemented in a communication system, in accordance with some embodiments of the present disclosure. The communication system includes a host computer, a base station, and a UE which may be those described with reference to FIGS. 14 and 15. For simplicity of the present disclosure, only drawing references to FIG. 18 will be included in this section. In step 1800 (which may be optional), the UE receives input data provided by the host computer. Additionally or alternatively, in step 1802, the UE provides user data. In sub-step 1804 (which may be optional) of step 1800, the UE provides the user data by executing a client application. In sub-step 1806 (which may be optional) of step 1802, the UE executes a client application which provides the user data in reaction to the received input data provided by the host computer. In providing the user data, the executed client application may further consider user input received from the user. Regardless of the specific manner in which the user data was provided, the UE initiates, in sub-step 1808 (which may be optional), transmission of the user data to the host computer. In step 1810 of the method, the host computer receives the user data transmitted from the UE, in accordance with the teachings of the embodiments described throughout this disclosure.

FIG. 19 is a flowchart illustrating a method implemented in a communication system, in accordance with some embodiments of the present disclosure. The communication system includes a host computer, a base station, and a UE which may be those described with reference to FIGS. 14 and 15. For simplicity of the present disclosure, only drawing references to FIG. 19 will be included in this section. In step 1900 (which may be optional), in accordance with the teachings of the embodiments described throughout this disclosure, the base station receives user data from the UE. In step 1902 (which may be optional), the base station initiates transmission of the received user data to the host computer. In step 1904 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AP Access Point
ASIC Application Specific Integrated Circuit
CAM Cooperative Awareness Message
CPU Central Processing Unit
CSI Channel State Information
D2D Device-to-Device
DENM Decentralized Environmental Notification Message DSP Digital Signal Processor
eNB Enhanced or Evolved Node B
EPC Evolved Packet Core
ETSI European Telecommunications Standards Institute
E-UTRAN Evolved Universal Terrestrial Radio Access Network
FPGA Field Programmable Gate Array
gNB New Radio Base Station
HARQ Hybrid Automatic Repeat Request
HSS Home Subscriber Server
ITS Intelligent Transport System
LTE Long Term Evolution
MME Mobility Management Entity
ms Milliseconds
MTC Machine Type Communication
NF Network Function
NR New Radio
OTT Over-the-Top
PDCCH Physical Downlink Control Channel
PDN Packet Data Network
PGW Packet Data Network Gateway
PRB Physical Resource Block
ProSe Proximity Services
PSBCH Physical Sidelink Broadcast Channel
PSCCH Physical Sidelink Control Channel
PSDCH Physical Sidelink Discovery Channel
PSSCH Physical Sidelink Shared Channel
PSSS Primary Sidelink Synchronization Signal
QoS Quality of Service
RA Resource Allocation
RAM Random Access Memory
RAN Radio Access Network
RB Resource Block
Rel- Release
ROM Read Only Memory
RRH Remote Radio Head
RSRP Reference Symbol Received Power/Reference Signal Received Power
RSU Roadside Unit
SCEF Service Capability Exposure Function
SCI Sidelink Control Information
SGW Serving Gateway
SL-BSR Sidelink Buffer Status Report
SLP Secure User Plane Location Platform
SPS Semi Persistent Scheduling
SR Scheduling Request
SSSS Secondary Sidelink Synchronization Signal
TB Transport Block
TR Technical Report
UE User Equipment
UTRAN Universal Terrestrial Radio Access Network
V2I Vehicle-to-Infrastructure
V2N Vehicle-to-Network
V2P Vehicle-to-Pedestrian
V2V Vehicle-to-Vehicle
V2X Vehicle-to-Everything Those skilled in the art will recognize improvements and modifications to the embodiments of the present disclosure. All such improvements and modifications are considered within the scope of the concepts disclosed herein.

What is claimed is:

1. A method performed by at least one wireless device for autonomous sidelink resource allocation, the method comprising:
   at a first time, T1, transmitting a first control message announcing a first reservation of a set of radio resources for sidelink communication;
   at a second time, T2, transmitting a second control message announcing a second reservation of a set of radio resources for sidelink communication; and
   at a third time, T3, performing a sidelink communication using the set of radio resources reserved by the second reservation, wherein the set of radio resources reserved by the second reservation comprises a superset of the set of radio resources reserved by the first reservation.

2. The method of claim 1 wherein performing the sidelink communication comprises transmitting a first data message using the set of radio resources reserved by the second reservation.

3. The method of claim 1 wherein performing the sidelink communication comprises performing a Vehicle-to-Everything, V2X, communication.

4. The method of claim 1 wherein performing the sidelink communication comprises communicating using a PC5 sidelink interface.

5. The method of claim 1 wherein the set of radio resources reserved by the second reservation and the set of radio resources reserved by the first reservation comprise identical radio resources.

6. The method of claim 1 wherein the set of radio resources reserved by the second reservation and the set of radio resources reserved by the first reservation comprise different radio resources.

7. The method of claim 1 wherein the second reservation releases at least some of the set of radio resources reserved by the first reservation.

8. The method of claim 1 wherein the second reservation releases all of the set of radio resources reserved by the first reservation.

9. The method of claim 1 wherein at least one of the set of radio resources reserved by the first reservation and the set of radio resources reserved by the second reservation were selected using a resource allocation algorithm.

10. The method of claim 9 wherein using the resource allocation algorithm comprises using random allocation, using allocation based on carrier sensing, and/or using allocation based on detection of unused or available radio resources.

11. The method of claim 1 wherein at least one of the set of radio resources reserved by the first reservation and the set of radio resources reserved by the second reservation were reserved according to an instruction from a network node.

12. The method of claim 11 wherein reserving according to an instruction from the network node comprises reserving a set of radio resources identified by the network node.

13. The method of claim 1 wherein performing the sidelink communication comprises transmitting a third control message announcing a third reservation of a set of radio resources for sidelink communication.

14. The method of claim 13 wherein transmitting the third control message operates as the first control message in another iteration/repetition of the process for performing a sidelink communication.

15. The method of claim 13 wherein a period of time between repeated sidelink communications is dynamically selected.

16. The method of claim 15 wherein the period of time between the repeated sidelink communications is dynamically selected based on a rate of data arriving at a transmit buffer of a User Equipment, UE, that is performing the repeated sidelink communications.

17. The method of claim 1 wherein the same UE transmits the first control message, transmits the second control message, and performs the sidelink communication.

18. The method of claim 1 wherein the first control message is transmitted by a first UE, wherein the first UE subsequently cancels the first reservation, wherein the second control message is transmitted by a second UE, and wherein the second UE performs the sidelink communication.

19. The method of claim 1 wherein the first control message is transmitted by a first UE, wherein the second control message is transmitted by a second UE, wherein the second reservation preempts the first reservation, and wherein the second UE performs the sidelink communication.

20. The method of claim 19 wherein the second reservation preempts the first reservation based on at least one of a transmission priority, a transmission latency requirement, a transmission type, or a transmission content.

21. The method of claim 19 wherein the first UE is notified that it has been preempted by receiving the second control message and determining, based on a content of the second control message, that it has been preempted and therefore should perform a sidelink communication using the set of radio resources reserved by the first reservation.

22. The method of claim 1 wherein the set of radio resources comprises a set of radio resources in the time and frequency domains.

23. The method of claim 1 wherein the set of radio resources comprises at least one Long Term Evolution, LTE, Physical Resource Block, PRB.

24. The method of claim 1 wherein T3 is calculated based on a set of parameters, the set of parameters comprising:
- a minimum inter-arrival time, DMIN, of packets at a UE transmit buffer;
- a delay, D, in the transmission of a previous packet from the time that the previous packet arrived in the buffer to the time that the previous packet was transmitted; and/or
- a delay budget, B.

25. The method of claim 24 wherein the time until T3, T, is calculated according to the formula T=DMIN−D+B.

26. The method of claim 1 wherein the set of radio resources reserved by the first reservation or the set of radio resources reserved by the second reservation comprises one or more sets of radio resources according to a pattern in time, in frequency, or in both time and frequency.

27. The method of claim 26 wherein the pattern is identified using a bitmap specified within the first or second reservation.

28. The method of claim 26 wherein the first or second reservation comprises information that:
- indicates the start of a repeating pattern; indicates the end of a repeating pattern;
- indicates that a repeating pattern should start or continue;
- indicates that a repeating pattern should stop;
- indicates the selection of a new pattern; and/or
- indicates a modification to a pattern or to the use of a pattern.

29. A wireless device for performing autonomous sidelink resource allocation, the wireless device comprising:
- one or more transmitters;
- one or more receivers;
- processing circuitry associated with the one or more transmitters and the one or more receivers, the processing circuitry configured to cause the wireless device to:
  - at a first time, T1, transmit a first control message announcing a first reservation of a set of radio resources for sidelink communication;
  - at a second time, T2, transmit a second control message announcing a second reservation of a set of radio resources for sidelink communication; and
  - at a third time, T3, perform a sidelink communication using the set of radio resources reserved by the second reservation, wherein the set of radio resources reserved by the second reservation comprises a superset of the set of radio resources reserved by the first reservation.

30. A non-transitory computer-readable storage medium having embodied therein computer-executable instructions for causing at least one wireless device to perform a method of autonomous sidelink resource allocation, the method comprising:
- at a first time, T1, transmitting a first control message announcing a first reservation of a set of radio resources for sidelink communication;
- at a second time, T2, transmitting a second control message announcing a second reservation of a set of radio resources for sidelink communication; and
- at a third time, T3, performing a sidelink communication using the set of radio resources reserved by the second reservation, wherein the set of radio resources reserved by the second reservation comprises a superset of the set of radio resources reserved by the first reservation.

* * * * *